United States Patent
Murali-Venkataraman et al.

(10) Patent No.: US 9,336,228 B2
(45) Date of Patent: May 10, 2016

(54) SYNCHRONIZATION OF PROGRAM CODE BETWEEN REVISION MANAGEMENT APPLICATIONS UTILIZING DIFFERENT VERSION-CONTROL ARCHITECTURES

(71) Applicant: Verizon Patent and Licensing Inc., Basking Ridge, NJ (US)

(72) Inventors: Rahul Murali-Venkataraman, Irving, TX (US); Ramesh Babu Ramakrishnan, Flower Mound, TX (US); Sinh V Nguyen, Plano, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 202 days.

(21) Appl. No.: 14/132,418

(22) Filed: Dec. 18, 2013

(65) Prior Publication Data
US 2015/0169614 A1  Jun. 18, 2015

(51) Int. Cl.
*G06F 17/30* (2006.01)

(52) U.S. Cl.
CPC ...... *G06F 17/30174* (2013.01); *G06F 17/3023* (2013.01); *Y10S 707/99952* (2013.01)

(58) Field of Classification Search
CPC ........... G06F 17/30174; G06F 17/3023; Y10S 707/99952
USPC ........................................................ 707/634
See application file for complete search history.

(56) References Cited

U.S. PATENT DOCUMENTS

| | | | | |
|---|---|---|---|---|
| 4,875,159 A * | 10/1989 | Cary | ............... | G06F 8/71 |
| 4,912,637 A * | 3/1990 | Sheedy | ............... | G06F 8/71 |
| 5,574,898 A * | 11/1996 | Leblang | ............... | G06F 11/3476 |
| 5,600,834 A * | 2/1997 | Howard | ............... | G06F 11/1435 707/610 |
| 5,649,200 A * | 7/1997 | Leblang | ............... | G06F 8/71 707/999.202 |
| 5,806,078 A * | 9/1998 | Hug | ............... | G06F 17/2288 707/999.202 |
| 5,884,323 A * | 3/1999 | Hawkins | ............... | G06F 17/30286 |
| 5,893,116 A * | 4/1999 | Simmonds | ............... | G06F 9/4401 707/612 |
| 5,978,791 A * | 11/1999 | Farber | ............... | G06F 17/30091 707/640 |
| 6,202,085 B1 * | 3/2001 | Benson | ............... | G06F 17/30008 707/E17.007 |
| 6,233,589 B1 * | 5/2001 | Balcha | ............... | G06F 17/30067 707/625 |
| 6,385,768 B1 * | 5/2002 | Ziebell | ............... | G06F 8/71 707/999.202 |
| 6,393,437 B1 * | 5/2002 | Zinda | ............... | G06F 8/20 200/203 |
| 6,457,170 B1 * | 9/2002 | Boehm | ............... | G06F 8/71 717/106 |

(Continued)

OTHER PUBLICATIONS

Rochkind, Marc J., "The Source Code Control System", IEEE Transactions on Software Engineering, vol. 1, No. 4, Dec. 1975, pp. 364-370.*

(Continued)

*Primary Examiner* — Phuong Thao Cao

(57) ABSTRACT

A device may receive a request to synchronize a first set of document revisions with a second set of document revisions. The first set of document revisions may be associated with a first format readable by a first application utilizing a stream architecture. The second set of document revisions may be associated with a second format readable by a second application utilizing a branch architecture. The device may determine synchronization configuration information, and may compare the first set of document revisions with the second set of document revisions based on the synchronization configuration information. The device may selectively modify one or more files based on comparing the first set of document revisions and the second set of document revisions. The device may provide information associated with selectively modifying the one or more files.

20 Claims, 21 Drawing Sheets

(56) References Cited

U.S. PATENT DOCUMENTS

| | | | | |
|---|---|---|---|---|
| 6,721,713 B1* | 4/2004 | Guheen | G06Q 99/00 | 705/1.1 |
| 6,757,893 B1* | 6/2004 | Haikin | G06F 8/71 | 717/170 |
| 6,928,644 B1* | 8/2005 | Kroening | G06F 8/63 | 717/121 |
| 6,976,093 B2* | 12/2005 | Lara | G06F 11/0709 | 707/999.201 |
| 7,389,309 B2* | 6/2008 | Edelstein | G06F 8/71 | |
| 7,395,281 B2* | 7/2008 | Edwards | G06F 17/30176 | |
| 7,555,196 B1* | 6/2009 | Crawford | G11B 27/10 | 348/170 |
| 7,702,747 B1* | 4/2010 | Liu | G06F 21/41 | 709/205 |
| 7,778,962 B2* | 8/2010 | Shah | G06F 9/52 | 707/610 |
| 8,180,739 B2* | 5/2012 | Arditi | G06F 17/30489 | 707/692 |
| 8,229,579 B2* | 7/2012 | Eldridge | G05B 15/02 | 700/31 |
| 8,417,673 B2* | 4/2013 | Stakutis | G06F 17/30067 | 707/662 |
| 8,880,464 B1* | 11/2014 | Haeske | G06F 7/00 | 707/615 |
| 9,077,733 B2* | 7/2015 | Kazan | G06F 9/4451 | |
| 9,158,785 B1* | 10/2015 | Rudkowski | G06F 17/30174 | |
| 2001/0042073 A1* | 11/2001 | Saether | G06F 17/30194 | |
| 2002/0038314 A1* | 3/2002 | Thompson | G06F 17/30194 | 707/640 |
| 2002/0091697 A1* | 7/2002 | Huang | G06F 17/30867 | |
| 2002/0184252 A1* | 12/2002 | Holtz | G06F 17/30091 | |
| 2002/0188667 A1* | 12/2002 | Kirnos | G06F 17/30176 | 709/203 |
| 2003/0204531 A1* | 10/2003 | Kuzmin | G06F 8/71 | |
| 2004/0015963 A1* | 1/2004 | Huber | G06F 8/71 | 717/178 |
| 2004/0068713 A1* | 4/2004 | Yannakoyorgos | G06F 11/3672 | 717/101 |
| 2004/0133544 A1* | 7/2004 | Kiessig | G06F 17/30067 | |
| 2004/0172425 A1* | 9/2004 | Edelstein | G06F 8/71 | |
| 2005/0039116 A1* | 2/2005 | Slack-Smith | G06F 17/24 | 715/255 |
| 2005/0138216 A1* | 6/2005 | Giles | G06Q 40/06 | 710/1 |
| 2005/0203969 A1* | 9/2005 | Kawabe | G06F 17/3023 | |
| 2005/0226597 A1* | 10/2005 | Cobb | G06F 8/71 | 386/200 |
| 2005/0261787 A1* | 11/2005 | Plante | G06F 8/71 | 700/30 |
| 2005/0262430 A1* | 11/2005 | Croft | G06Q 10/10 | 715/226 |
| 2006/0179083 A1* | 8/2006 | Kulkarni | G06F 11/1451 | |
| 2006/0242197 A1* | 10/2006 | Tsyganskiy | G06F 8/72 | |
| 2007/0027936 A1* | 2/2007 | Stakutis | G06F 11/1451 | |
| 2007/0220497 A1* | 9/2007 | Chudukatil | G06F 8/71 | 717/140 |
| 2007/0266165 A1* | 11/2007 | Li | G06F 8/71 | 709/230 |
| 2007/0276836 A1* | 11/2007 | Chatterjee | G06F 17/30194 | |
| 2007/0283011 A1* | 12/2007 | Rakowski | H04L 41/0803 | 709/225 |
| 2008/0005195 A1* | 1/2008 | Li | G06F 17/30174 | |
| 2008/0046484 A1* | 2/2008 | Ellis | G06Q 10/063 | |
| 2008/0077634 A1* | 3/2008 | Quakenbush | G06F 17/30088 | |
| 2008/0133616 A1* | 6/2008 | Willoughby | G06F 11/3672 | |
| 2008/0168072 A1* | 7/2008 | Freedman | G06F 17/30581 | |
| 2008/0222212 A1* | 9/2008 | Prasad | G06F 17/30206 | |
| 2008/0228671 A1* | 9/2008 | Nagaraj | G06Q 99/00 | 705/500 |
| 2009/0083101 A1* | 3/2009 | Wall | G06Q 10/063114 | 705/7.15 |
| 2009/0083165 A1* | 3/2009 | Wall | G06Q 10/087 | 705/28 |
| 2009/0083210 A1* | 3/2009 | Clark | G06N 7/005 | 706/48 |
| 2009/0083308 A1* | 3/2009 | Wall | G06Q 10/063114 | |
| 2009/0083343 A1* | 3/2009 | Wall | G06F 8/71 | |
| 2009/0276698 A1* | 11/2009 | Clarke | G06F 17/2211 | 715/255 |
| 2009/0300580 A1* | 12/2009 | Heyhoe | G06F 8/71 | 717/106 |
| 2009/0313331 A1* | 12/2009 | Rasmussen | G06F 17/2288 | 709/205 |
| 2010/0115254 A1* | 5/2010 | Deng | G06F 9/44505 | 713/1 |
| 2011/0055155 A1* | 3/2011 | Page | G06F 8/68 | 707/625 |
| 2011/0093434 A1* | 4/2011 | Arora | G06Q 10/107 | 707/622 |
| 2011/0113011 A1* | 5/2011 | Prorock | G11B 27/36 | 707/634 |
| 2011/0145363 A1* | 6/2011 | Ananthanarayanan | G06F 17/30132 | 709/218 |
| 2011/0197121 A1* | 8/2011 | Kletter | G06F 17/2211 | 715/234 |
| 2011/0218964 A1* | 9/2011 | Hagan | G06F 17/30581 | 707/626 |
| 2011/0307862 A1* | 12/2011 | Abrams | G06F 8/71 | 717/120 |
| 2012/0023476 A1* | 1/2012 | Bugayenko | G06F 8/71 | 717/103 |
| 2012/0185434 A1* | 7/2012 | Giampaolo | H04L 67/1095 | 707/634 |
| 2012/0226933 A1* | 9/2012 | Baptist | G06F 11/0727 | 714/6.2 |
| 2012/0254108 A1* | 10/2012 | Wedewer | H04W 4/003 | 707/618 |
| 2012/0297363 A1* | 11/2012 | Perisic | G06F 8/71 | 717/122 |
| 2012/0330887 A1* | 12/2012 | Young | G06F 17/30017 | 707/610 |
| 2013/0036400 A1* | 2/2013 | Bak | G06F 8/71 | 717/101 |
| 2013/0073063 A1* | 3/2013 | Kiffmeier | G05B 19/0426 | 700/86 |
| 2013/0085992 A1* | 4/2013 | Prasad | G06F 17/30575 | 707/634 |
| 2013/0151468 A1* | 6/2013 | Wu | G06F 17/30174 | 707/614 |
| 2013/0185252 A1* | 7/2013 | Palmucci | G06F 17/30011 | 707/608 |
| 2013/0185346 A1* | 7/2013 | Lee | H04L 67/02 | 709/201 |
| 2013/0325807 A1* | 12/2013 | Sokolov | G06F 17/30174 | 707/638 |
| 2014/0095456 A1* | 4/2014 | Pidduck | G06F 17/30309 | 707/695 |
| 2014/0095710 A1* | 4/2014 | Kazan | G06F 9/4451 | 709/224 |
| 2014/0201144 A1* | 7/2014 | Vibhor | H04L 29/0854 | 707/634 |
| 2014/0222758 A1* | 8/2014 | March | G06F 17/3023 | 707/638 |
| 2014/0281872 A1* | 9/2014 | Glover | G06F 17/2288 | 715/229 |
| 2014/0282353 A1* | 9/2014 | Jubran | G06F 8/00 | 717/101 |
| 2014/0379851 A1* | 12/2014 | LeCroy | H04L 67/02 | 709/217 |
| 2015/0019486 A1* | 1/2015 | Gaikwad | G06F 9/542 | 707/625 |
| 2015/0106790 A1* | 4/2015 | Bigwood | G06F 11/3624 | 717/127 |

(56) References Cited

U.S. PATENT DOCUMENTS

| | | | | |
|---|---|---|---|---|
| 2015/0120663 | A1* | 4/2015 | Le Scouarnec | H04L 67/10 707/638 |
| 2015/0120685 | A1* | 4/2015 | Burckart | G06F 17/30348 707/695 |
| 2015/0134614 | A1* | 5/2015 | Sachs | G06F 17/30174 707/638 |
| 2015/0142740 | A1* | 5/2015 | Behuria | G06F 17/30575 707/634 |
| 2015/0169614 | A1* | 6/2015 | Murali-Venkataraman | G06F 17/30174 707/634 |

OTHER PUBLICATIONS

Takata et al., "GRAM—A P2P System of Group Revision Assistance Management", In Proceedings of the 18th International Conference on Advanced Information Networking and Application (AINA '04), IEEE, 6 pages, 2004.*

Tichy, Walter F., "RCS—A system for Version Control", Software—Practice & Experience, vol. 15, No. 7, Jul. 1985, pp. 637-654.*

Yip et al., "Pastwatch: A Distributed Version Control System", NSDI '06: 3rd Symposium on Networked Systems Design & Implementation, USENIX Association, pp. 381-394, 2006.*

SOA News Desk, "AccuRev Unveils SCM Coexistence Solution for ClearCase", http://soa.sys-con.com/node/510236, Mar. 3, 2008, 5 pages.

* cited by examiner

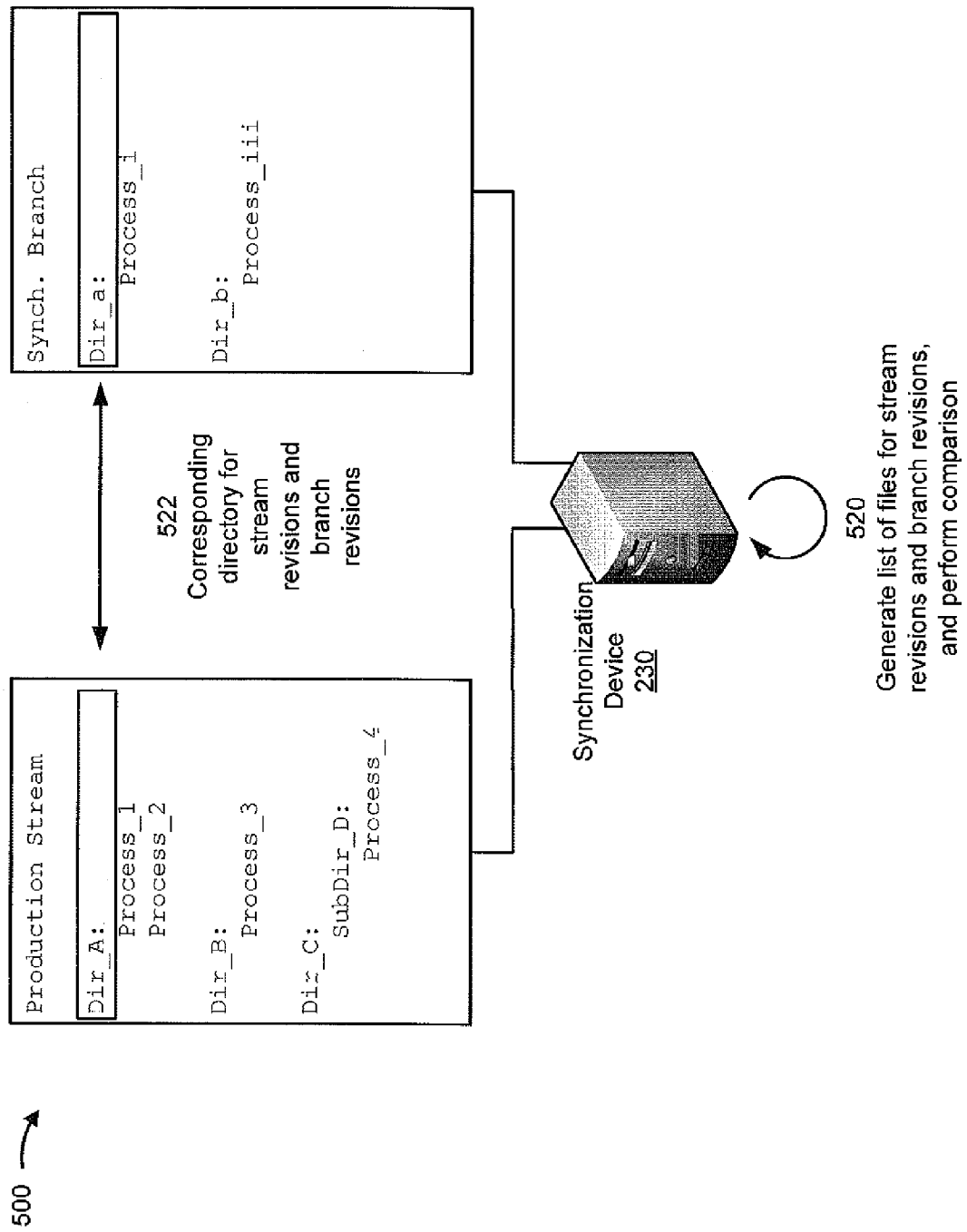

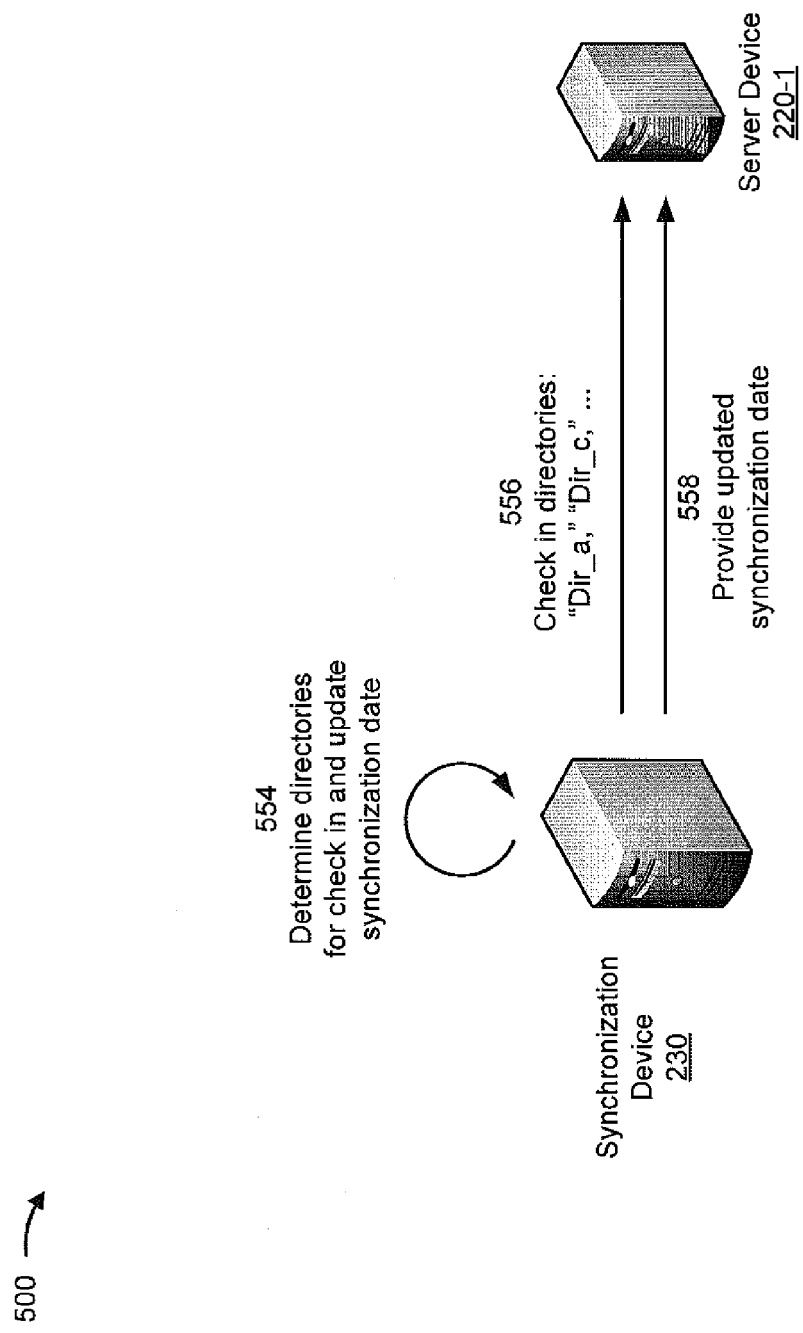

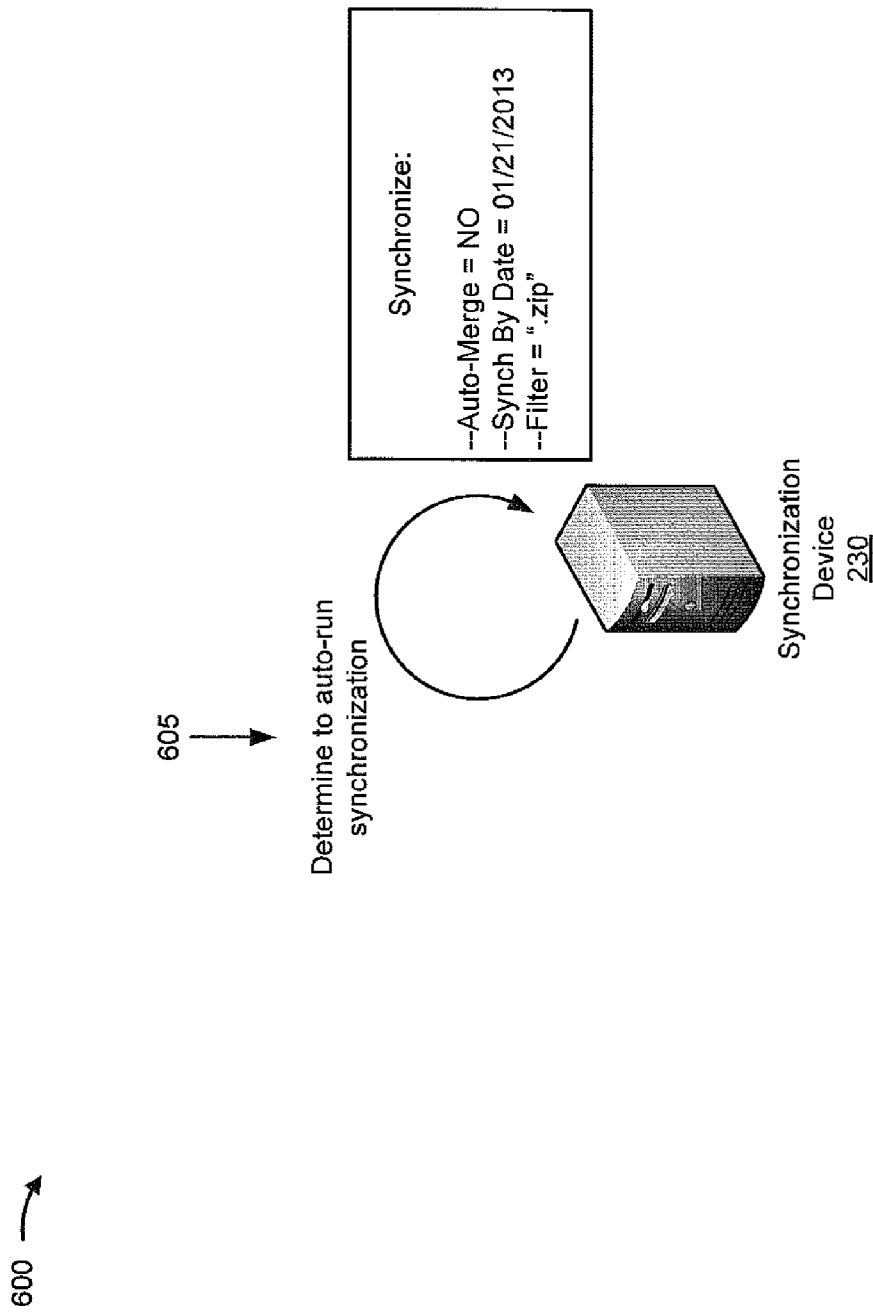

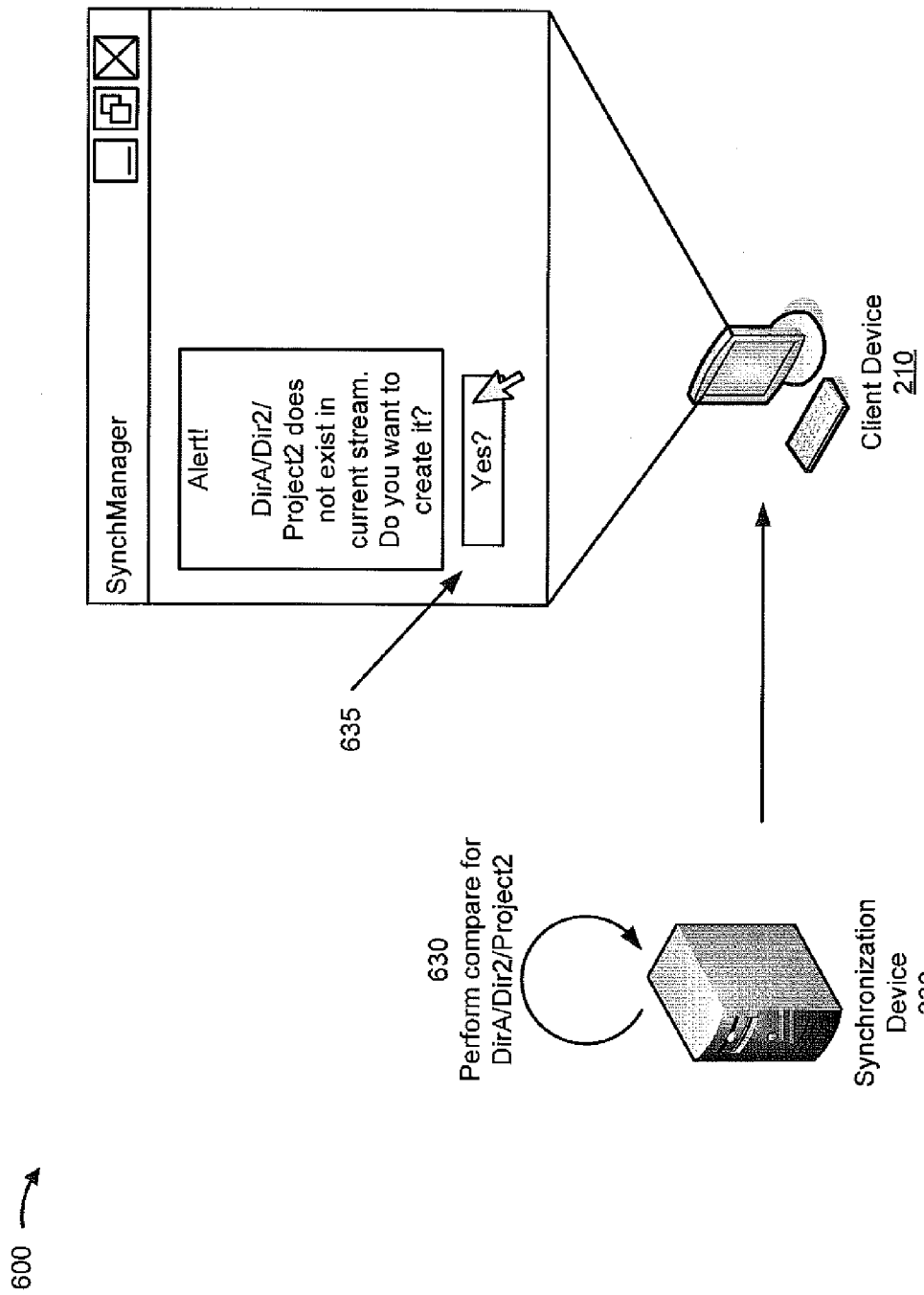

US 9,336,228 B2

SYNCHRONIZATION OF PROGRAM CODE BETWEEN REVISION MANAGEMENT APPLICATIONS UTILIZING DIFFERENT VERSION-CONTROL ARCHITECTURES

BACKGROUND

An application may be developed by multiple users working from multiple locations. The multiple users may utilize a particular revision management application to support parallel application development.

BRIEF DESCRIPTION OF THE DRAWINGS

FIGS. 5A-5K are diagrams of an example implementation relating to the example process shown in FIG. 4; and FIGS. 6A-6F are diagrams of another example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A set of users may use a revision management application utilizing a particular revision-control architecture, such as a stream architecture, a branch architecture, or the like, to manage parallel application development. A set of document revisions may be associated with a format that is readable by the revision management application. However, a complex application development team may include multiple sets of users, trained on multiple different revision management applications. Implementations described herein may facilitate synchronization of a set of document revisions between different revision management applications utilizing different revision-control architectures.

Figure 1:
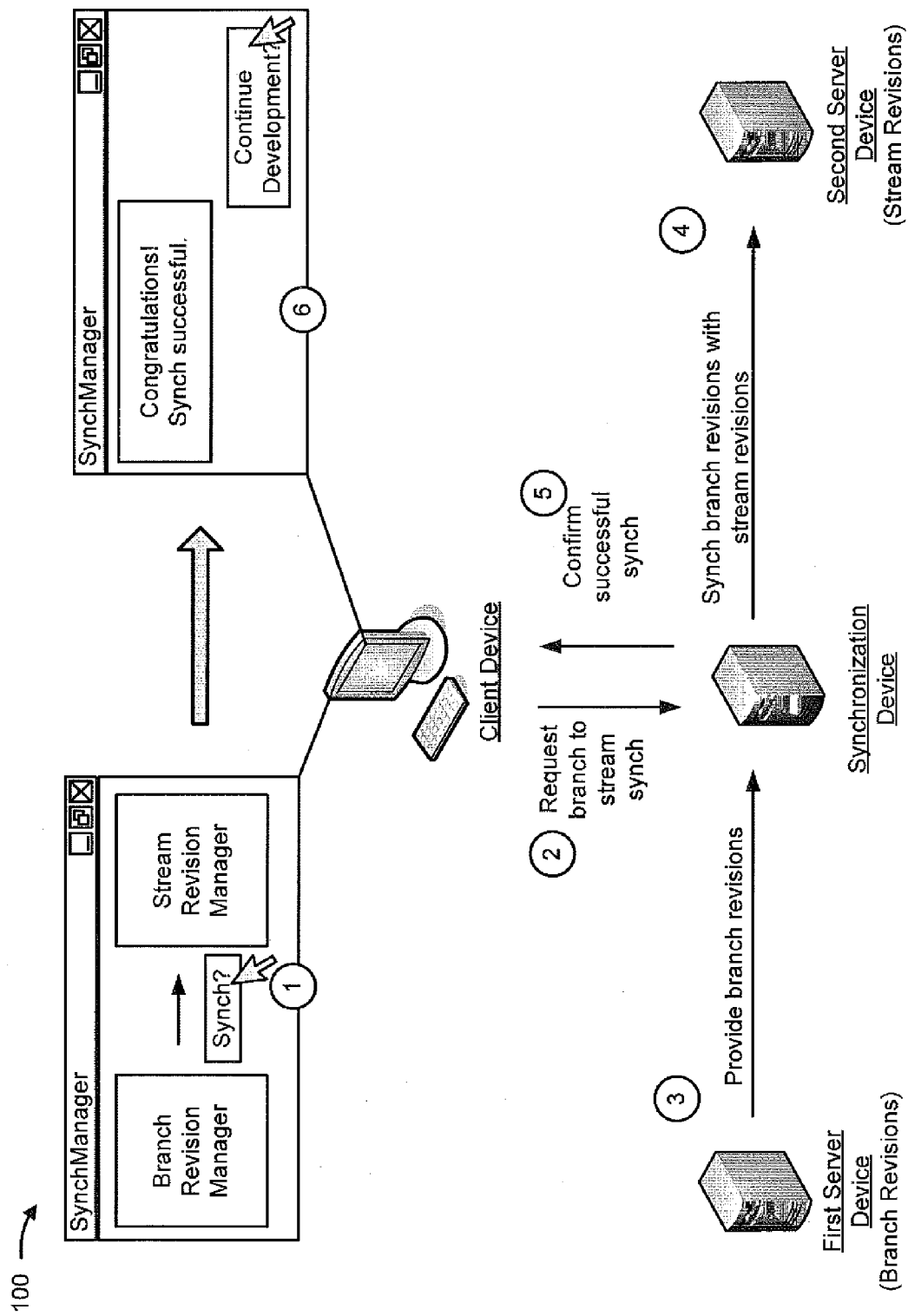
FIG. 1 is a diagram of an overview of an example implementation described herein.

FIG. 1 is a diagram of an overview of an example implementation 100 described herein. Example implementation 100 may include a client device, a synchronization device, a first server device (e.g., that provides a first revision management application utilizing a branch architecture), and a second server device (e.g., that provides a second revision management application utilizing a stream architecture). As shown in FIG. 1, a user of the client device may select to synchronize a first set of document revisions (e.g., text revisions, program code revisions, etc.) with a second set of document revisions. The first set of document revisions may be associated with a first format (e.g., a branch architecture format), and may be created using the first revision management application. The second set of document revisions may be associated with a second format (e.g., a stream architecture format), and may be created using the second revision management application. The client device may, based on a user interaction with a button, provide a request for a synchronization (e.g., a synchronization of "branch revisions" with "stream revisions").

The synchronization device may receive the request, and may retrieve the first set of document revisions associated with the first format (e.g., the branch revisions) from the first server device. The synchronization device may determine synchronization configuration information associated with synchronizing the first set of document revisions with the second set of document revisions, such as a quantity of files to synchronize, a set of file extensions to exclude from synchronization, or the like. The synchronization device may access the second set of document revisions associated with the second format (e.g., the stream revisions), and may compare the first set of document revisions with the second set of document revisions. The synchronization device may synchronize the first set of document revisions with the second set of document revisions by selectively modifying files associated with the first set of document revisions and the second set of document revisions (e.g., files stored by the second server device).

The synchronization device may provide information to the client device confirming that synchronization has occurred, and the client device may display a confirmation notification to be viewed by the user. The user may continue revision of the synchronized document revisions utilizing the second revision management application (e.g., via the second server device). In this way, a set of document revisions associated with a first format may be synchronized with a set of document revisions associated with a second format for use by a user of a revision management application associated with the second format.

A revision management application may refer to an application that facilitates version control, such as for a text document, a program code file, a web site, or the like. A revision management application may maintain an association between multiple versions via a particular architecture, such as a branch architecture, a stream architecture, or the like. A document revision may refer to information associated with a version of a set of files, such as information identifying a change (e.g., from another version of the set of files), information associated with reverting the change, a revision identifier, a revision number, or the like.

While systems and methods are described herein in terms of a first set of document revisions associated with a branch architecture being synchronized with a second set of document revisions associated with a stream architecture, the systems and methods may also be described in terms of another first set of document revisions associated with the stream architecture being synchronized to another second set of document revisions associated with the branch architecture. For example, the first server device may be associated with a first application utilizing a stream architecture and the second server device may be associated with a second application utilizing a branch architecture.

Figure 2:
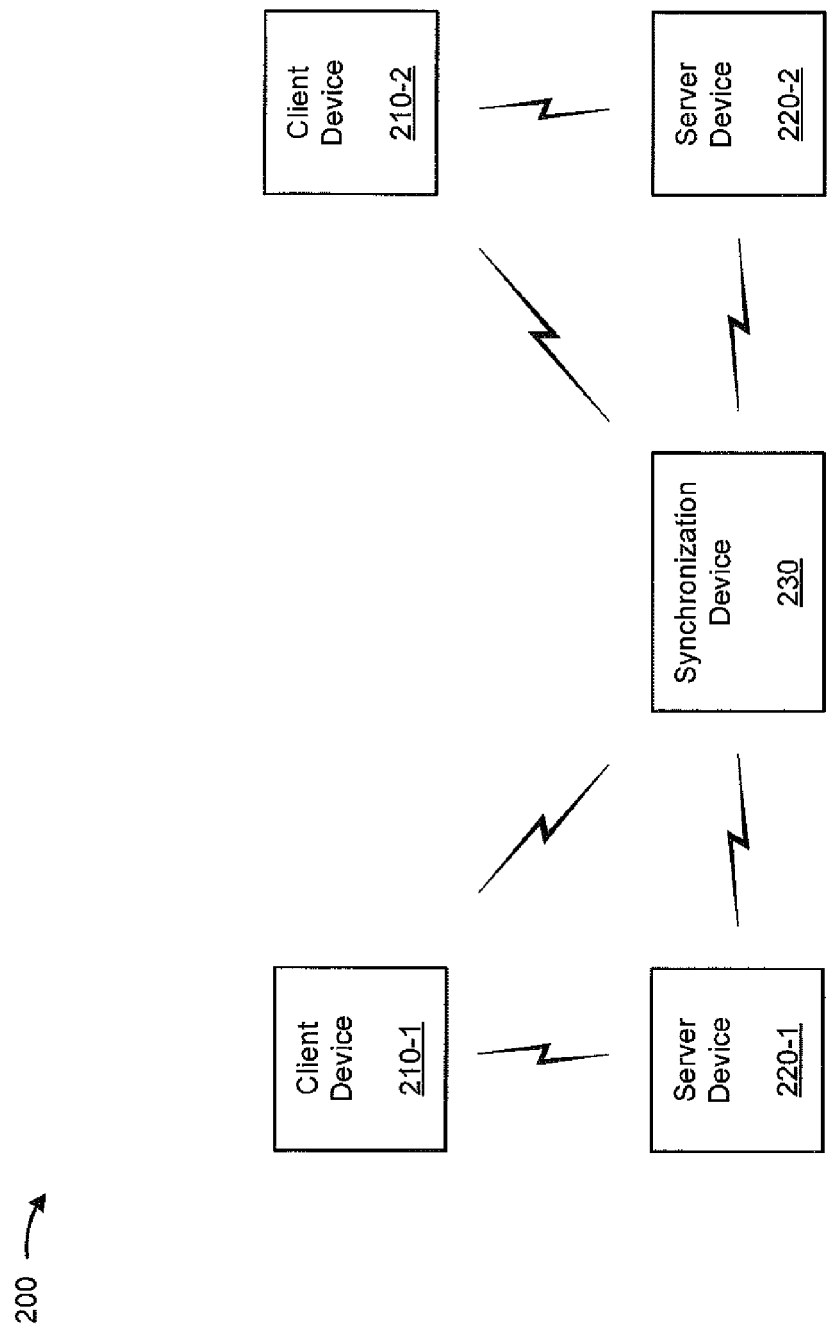
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client devices 210-1 to 210-2 (hereinafter referred to collectively as "client devices 210," and individually as "client device 210"), server devices 220-1 to 220-2 (hereinafter referred to collectively as "server devices 220," and individually as "server device 220"), and synchronization device 230. Devices of environment 200 may interconnect via wired connections, wireless connections, or a combination of wired and wireless connections.

Client device 210 may include a device capable of receiving, generating, storing, processing, and/or providing a set of document revisions and/or information associated with the set of document revisions. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may be associated with a particular server device 220. For example, client device 210-1 may be associated with server device 220-1 (e.g., that provides a first revision management application), and client device 210-2 may be associated with server device 220-2 (e.g., that provides a second revision management application). Client device 210 may communicate with synchronization device 230 to perform one or more processes associated with synchronization.

Server device 220 may include one or more devices capable of receiving, generating, storing, processing, and/or providing a set of document revisions and/or information associated with the set of document revisions. For example, server device 220 may include a computing device, such as a server, a desktop computer, a laptop computer, a tablet computer, a handheld computer, or a similar device. In some implementations, server device 220 may be associated with a set of client devices 210, and may provide a particular revision management application, such as AccuRev, IBM ClearCase Rational, or the like, to the set of client devices 210.

Synchronization device 230 may include one or more devices capable of receiving, generating, storing, processing, and/or providing information associated with synchronizing a first set of document revisions with a second set of document revisions. For example, synchronization device 230 may include a computing device, such as a server, a desktop computer, a laptop computer, a tablet computer, a handheld computer, or a similar device. In some implementations, synchronization device 230 may be capable of accessing a set of document revisions associated with server device 220-1, and/or modifying the set of document revisions associated with server device 220-2.

The number of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. For example, while server device 220 and synchronization device 230 are shown as separate devices, server device 220 and synchronization device 230 may be implemented in a single device or in a single collection of devices. Additionally, one or more of the devices of environment 200 may perform one or more functions described as being performed by another one or more devices of environment 200.

Figure 3:
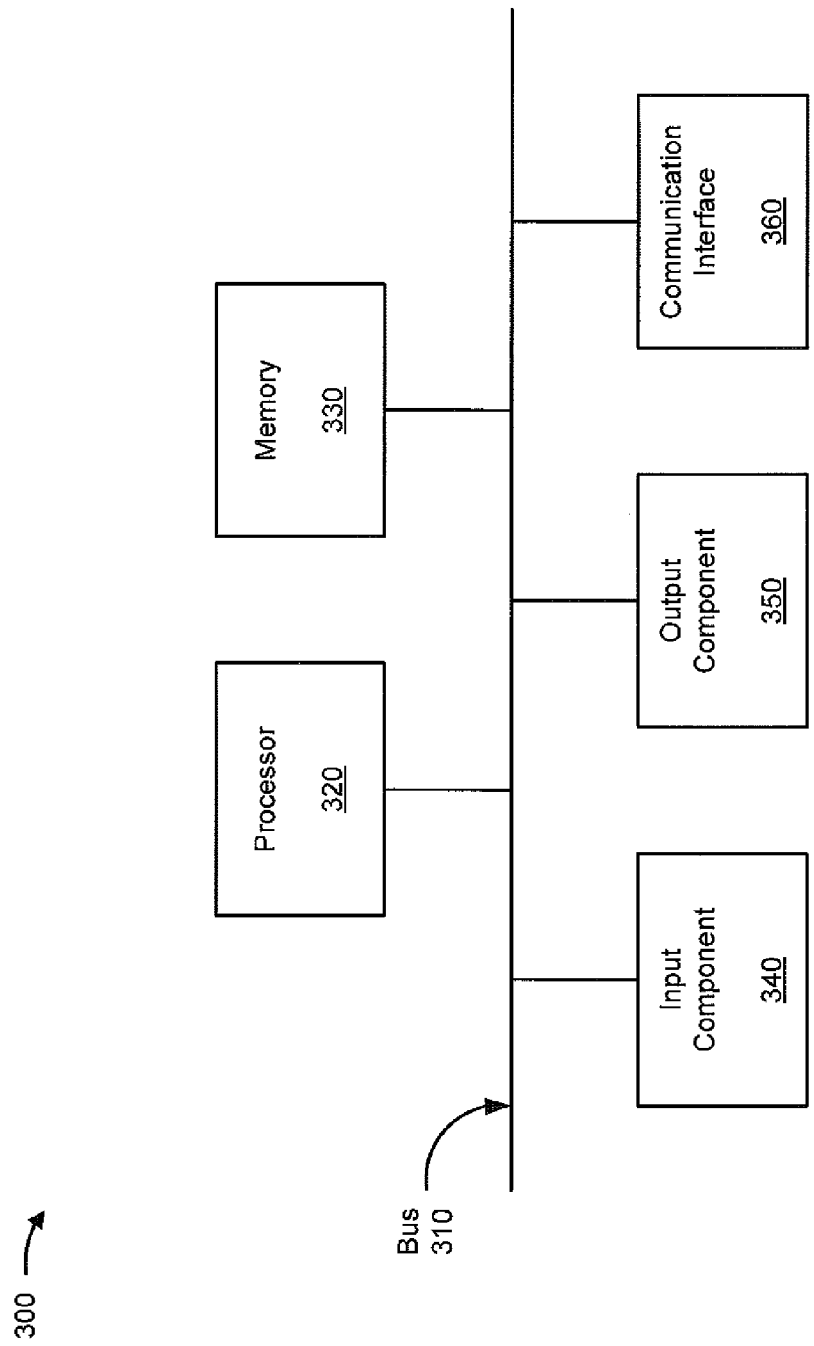
FIG. 3 is a diagram of example components of one or more devices of FIG. 2.

FIG. 3 is a diagram of example components of a device 300. Device 300 may correspond to client device 210, server device 220, and/or synchronization device 230. In some implementations, each of client device 210, server device 220, and/or synchronization device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
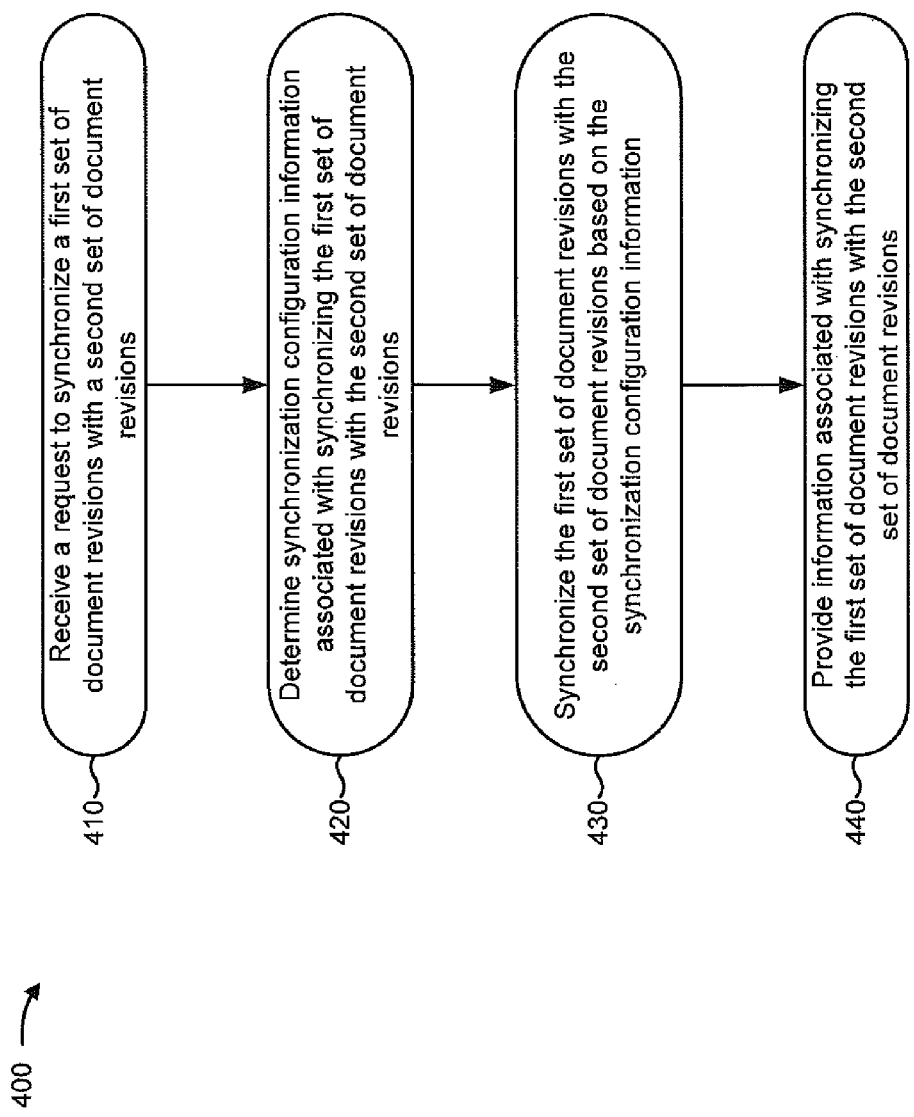
FIG. 4 is a flow chart of an example process for synchronizing program code revisions between a first format associated with a first revision management application and a second format associated with a second revision management application.

FIG. 4 is a flow chart of an example process 400 for synchronizing program code revisions between a first format associated with a first revision management application and a second format associated with a second revision management application. In some implementations, one or more process blocks of FIG. 4 may be performed by synchronization device 230. Additionally, or alternatively, one or more process blocks of FIG. 4 may be performed by another device or a group of devices separate from or including synchronization device 230, such as client device 210 and/or server device 220.

As shown in FIG. 4, process 400 may include receiving a request to synchronize a first set of document revisions with a second set of document revisions (block 410). For example, synchronization device 230 may receive the request to synchronize the first set of document revisions (e.g., associated with a first server device 220) with the second set of document revisions (e.g., associated with a second server device 220). In some implementations, synchronization device 230 may receive the request from client device 210 (e.g., based on a user selection). Additionally, or alternatively, synchronization device 230 may receive information that identifies a date and/or a time for synchronization (e.g., a recurring synchronization), and may automatically perform synchronization based on the identified date and/or time.

Synchronization may refer to merging information associated with the first set of document revisions into the second set of document revisions. For example, when a first user revises first program code using a first revision management application associated with first server device 220 (e.g., utilizing a first architecture), a second user may request that the revised first program code be merged into second program code that is being revised by the second user via a second revision management application associated with second server device 220 (e.g., utilizing a second architecture).

Synchronization device 230 may determine the first set of document revisions and/or the second set of document revisions based on receiving the request, in some implementations. A set of document revisions may refer to information generated in a particular format readable by a revision management application that maintains an association between one or more versions of a file via a particular architecture. For example, the revision management application may associate one or more versions of program code using a branch architecture, a stream architecture, or the like.

In some implementations, synchronization device 230 may select a particular set of document revisions as the first set of document revisions based on information provided in the request. For example, when the first revision management application utilizes a stream architecture, synchronization device 230 may receive information associated with identifying a set of document revisions corresponding to a production stream (e.g., a particular repository that is associated with a particular set of document revisions), a subset of a production stream (e.g., a particular directory, a particular file, etc.), or the like. Additionally, or alternatively, when the first revision management application utilizes a branch architecture, synchronization device 230 may receive information associated with identifying a set of document revisions corresponding to a production branch (e.g., another particular repository that is associated with another particular set of document revisions).

In some implementations, synchronization device 230 may log into the first revision management application and/or the second revision management application. For example, the request may include authorization information for synchronization device 230 to log into the first revision management application and/or the second revision management application. In this case, synchronization device 230 may request a particular set of document revisions based on having logged into the first revision management application and/or the second revision management application.

In some implementations, synchronization device 230 may determine a repository (e.g., a workspace) for synchronizing document revisions based on receiving the request. For example, when the second revision management application includes a development stream (e.g., a particular stream that is associated with the second set of document revisions), synchronization device 230 may generate a workspace for merging document revisions from a production branch (e.g., a particular branch that is associated with the first set of document revisions). Additionally, or alternatively, synchronization device 230 may identify a previously used workspace with which to merge document revisions.

In some implementations, when the second revision management application includes a development branch (e.g., that is associated with the second set of document revisions), synchronization device 230 may create a temporary branch for merging document revisions from a production stream (e.g., that is associated with the first set of document revisions). In this case, synchronization device 230 may merge changes from the temporary branch into the development branch.

As further shown in FIG. 4, process 400 may include determining synchronization configuration information associated with synchronizing the first set of document revisions with the second set of document revisions (block 420). For example, synchronization device 230 may determine synchronization configuration information based on the request by client device 210. Additionally, or alternatively, synchronization device 230 may determine synchronization configuration information based on stored information associated with configuring synchronization device 230. Synchronization configuration information may refer to information associated with selecting files that are to be synchronized, settings with which files will be synchronized, or the like. For example, synchronization device 230 may determine, based on the synchronization configuration information, to synchronize a first file associated with the first set of document revisions, and may determine not to synchronize a second file associated with the first set of document revisions.

Synchronization device 230 may identify one or more files for synchronization associated with the first set of document revisions based on the synchronization configuration information, in some implementations. For example, synchronization device 230 may determine that the synchronization configuration indicates that the entire set of files is to be synchronized. Additionally or alternatively, synchronization device 230 may determine that synchronization is to occur for one or more files based on a synchronization date, a revision date, or the like. Additionally, or alternatively, synchronization device 230 may determine that synchronization is to occur for a particular file being viewed via client device 210. For example, client device 210 may provide information (e.g., included in the request), identifying a file being viewed by a user, and synchronization device 230 may determine to synchronize a corresponding file stored via first server device 220. Additionally, or alternatively, synchronization device 230 may determine that synchronization is to occur for a particular quantity of files, for a particular quantity of time, for a particular quantity of data, or the like. In some implementations, synchronization device 230 may determine to synchronize a first quantity of files (e.g., program code files), and may test the first quantity of files prior to synchronizing a second quantity of files.

Synchronization device 230 may determine one or more files associated with the first set of document revisions that are to be filtered out of synchronization based on the synchronization configuration information, in some implementations. For example, the synchronization configuration information may indicate that a file associated with a particular file type (e.g., an image, a compressed set of files, etc.), a particular file extension, or the like is to be avoided during synchronization. Additionally, or alternatively, synchronization device 230 may determine that a file satisfying a threshold size is to be avoided during synchronization based on the synchronization configuration information.

Synchronization device 230 may determine whether to utilize user input in resolving a synchronization conflict (e.g., a detected difference between the first set of document revisions and the second set of document revisions), in some implementations. For example, synchronization device 230 may determine to synchronize the first set of document revisions with the second set of document revisions without further user input. Additionally, or alternatively, synchronization device 230 may provide information identifying a conflict for user selection (e.g., via client device 210) when comparing the first set of revisions and the second set of revisions.

As further shown in FIG. 4, process 400 may include synchronizing the first set of document revisions with the second set of document revisions based on the synchronization configuration information (block 430). For example, synchronization device 230 may synchronize the first set of document revisions with the second set of document revisions. In some implementations, synchronization device 230 may detect a conflict between the first set of document revisions and the second set of document revisions. For example, synchronization device 230 may compare the first set of document revisions with the second set of document revisions, and may determine that files associated with the first set of document revisions do not correspond to other files associated with the second set of document revisions. In this case, synchronization device 230 may selectively modify files associated with the second set of document revisions (e.g., by providing new files, modified files, or the like to second server device 220).

Synchronization device 230 may identify a process, such as a directory process, a file process, or the like, when comparing the first set of document revisions with the second set of document revisions, in some implementations. For example, synchronization device 230 may compare a particular process of the first set of document revisions with the second set of document revisions, and may determine that a corresponding process does not exist for the second set of document revisions. In this case, synchronization device 230 may selectively modify the files associated with the second set of document revisions by generating a corresponding process for the second set of document revisions.

In some implementations, synchronization device 230 may check out a directory (e.g., a subdirectory, a parent directory, a folder, etc.), a file, or the like associated with the corresponding process for the second set of document revisions when generating the corresponding process. Checking out may refer to instructing second server device 220 (e.g., associated with the second set of document revisions) to deny access (e.g., modification) to particular information (e.g., a directory, a process, a file, etc.), until the particular information is checked in. For example, when synchronization device 230 is synchronizing a first set of document revisions associated with a stream architecture with a second set of document revisions associated with a branch architecture, synchronization device 230 may provide information to server device 220 indicating that server device 220 is to deny access to a parent directory for a newly created process, when synchronization device 230 is modifying the newly created process.

Additionally, or alternatively, synchronization device 230 may indicate that a change is to be promoted when generating the corresponding process for the second set of document revisions. Promoting a change may refer to copying and/or merging information (e.g., a directory, a process, a file, a document, etc.) from a first repository (e.g., a temporary workspace) to a second repository (e.g., a development stream, a testing stream, a production stream, etc.). For example, when synchronization device 230 is synchronizing a first set of document revisions associated with a branch architecture with a second set of document revisions associated with a stream architecture, synchronization device 230 may indicate that server device 220 is to promote a new process from a temporary workspace to a development stream associated with the second set of document revisions.

In some implementations, synchronization device 230 may identify and/or create one or more new processes recursively. For example, when processing a set of files with a parent directory that includes a particular file structure, synchronization device 230 may recursively traverse the file structure to identify conflicts between the first set of document revisions and the second set of document revisions.

Synchronization device 230 may identify first particular information, such as a process, a file, a directory, or the like for the first set of document revisions corresponding to second particular information for the second set of document revisions when comparing the first set of document revisions with the second set of document revisions. In this case, synchronization device 230 may perform a comparison (e.g., a binary comparison, or the like) of the first particular information with the corresponding second particular information to determine one or more conflicts, such as different program code, different functions, different text, different data, or the like. In some implementations, synchronization device 230 may selectively modify the second set of document revisions based on the first particular information based on the one or more conflicts between the first particular information and the second particular information. For example, synchronization device 230 may replace program code associated with the second set of document revisions with program code associated with the first set of document revisions.

In some implementations, synchronization device 230 may check out a parent directory associated with the second particular information when selectively modifying the second set of document revisions. For example, when synchronization device 230 is synchronizing a first set of document revisions associated with a stream architecture with a second set of document revisions associated with a branch architecture, synchronization device 230 may provide information to server device 220 indicating that server device 220 is to deny access to a parent directory for the second particular information.

Additionally, or alternatively, synchronization device 230 may copy the first particular information to the second set of document revisions, and may promote the first particular information, when selectively modifying the second set of document revisions. For example, when synchronization device 230 is synchronizing a first set of document revisions associated with a branch architecture with a second set of document revisions associated with a stream architecture, synchronization device 230 may copy the first particular information to a temporary workspace associated with the second set of document revisions. In this case, synchronization device 230 may indicate that the second revision management application is to promote the copied first particular information from the temporary workspace to a development stream associated with the second set of document revisions.

As further shown in FIG. 4, process 400 may include providing information associated with synchronizing the first set of document revisions with the second set of document revisions (block 440). For example, synchronization device 230 may provide information associated with synchronizing the first set of document revisions with the second set of document revisions to client device 210 and/or server device 220. In some implementations, synchronization device 230 may provide one or more files, modified contents for one or more files, or the like when providing information associated with the synchronization to server device 220. For example, synchronization device 230 may provide information modifying the second set of document revisions stored by server device 220.

Synchronization device 230 may check in one or more files, directories, etc. when providing information associated with the synchronization to server device 220, in some implementations. For example, when synchronization device 230 is synchronizing a first set of document revisions associated with a stream architecture with a second set of document revisions associated with a branch architecture, synchronization device 230 may check in one or more directories that had been checked out when modifying information associated with the one or more directories. In some implementations, synchronization device 230 may check in multiple directories at one time. Additionally, or alternatively, synchronization device 230 may check in a particular directory when synchronization device 230 determines that modification to the particular directory has completed.

Synchronization device 230 may provide information associated with promoting one or more changes (e.g., to a file, a process, a directory, etc.) when providing information associated with synchronization to server device 220, in some implementations. For example, when synchronization device 230 is synchronizing a first set of document revisions associated with a branch architecture with a second set of document revisions associated with a stream architecture, synchronization device 230 may promote the one or more changes from a temporary workspace to a development stream (e.g., a stream associated with further revision of the file, the process, the directory, etc.).

Synchronization device 230 may update a synchronization date identifier when providing information associated with synchronization to server device 220, in some implementations. For example, synchronization device 230 may provide information to first server device 220 associated with the first set of document revisions and/or second server device 220 associated with the second set of document revisions indicating one or more files, documents, directories, processes, or the like that have been synchronized.

Synchronization device 230 may provide confirmation of synchronization to client device 210 when providing information associated with the synchronization, in some implementations. For example, synchronization device 230 may provide information identifying first document revisions that have been synchronized with the second document revisions. In some implementations, synchronization device 230 may provide information associated with facilitating user resolution of a conflict to be synchronized from the first set of document revisions. For example, synchronization device 230 may provide a set of conflicts, and may receive user input associated with resolving the set of conflicts.

In this way, a first set of document revisions associated with a first format readable by a first revision management application utilizing a first revision-control architecture may be synchronized with a second set of document revisions associated with a second format readable by a second revision management application utilizing a second revision-control architecture.

Although FIG. 4 shows example blocks of process 400, in some implementations, process 400 may include additional blocks, fewer blocks, or differently arranged blocks than those depicted in FIG. 4. Additionally, or alternatively, two or more of the blocks of process 400 may be performed in parallel.

Figure 5A:
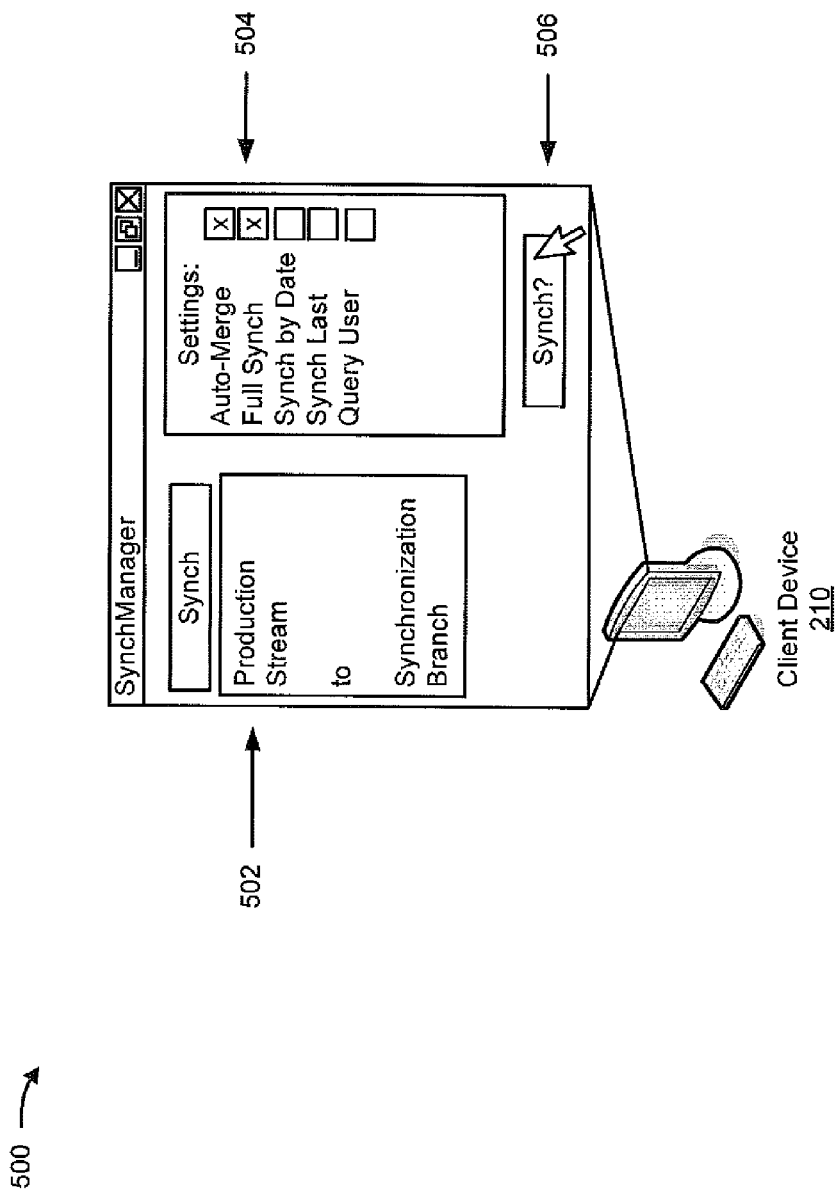

FIGS. 5A-5K are diagrams of an example implementation 500 relating to process 400 shown in FIG. 4. As shown in FIG. 5A, example implementation 500 includes client device 210. As shown by reference number 502, assume that client device 210 requests that a first set of document revisions from a first repository (e.g., "Production Stream") associated with a first revision management application utilizing a stream architecture be synchronized with a second set of document revisions from a second repository (e.g., "Synchronization Branch") associated with a second revision management application utilizing a branch architecture. As shown by reference number 504, the user selects (e.g., via client device 210) synchronization configuration information to provide with the request. For example, the user has indicated that synchronization is to occur without further user input (e.g., "Auto-Merge"), and that all files associated with the branch revisions and the stream revisions are to be synchronized (e.g. "Full Synch"). As shown by reference number 506, based on user interaction with a button, client device 210 is instructed to provide the request.

Figure 5B:
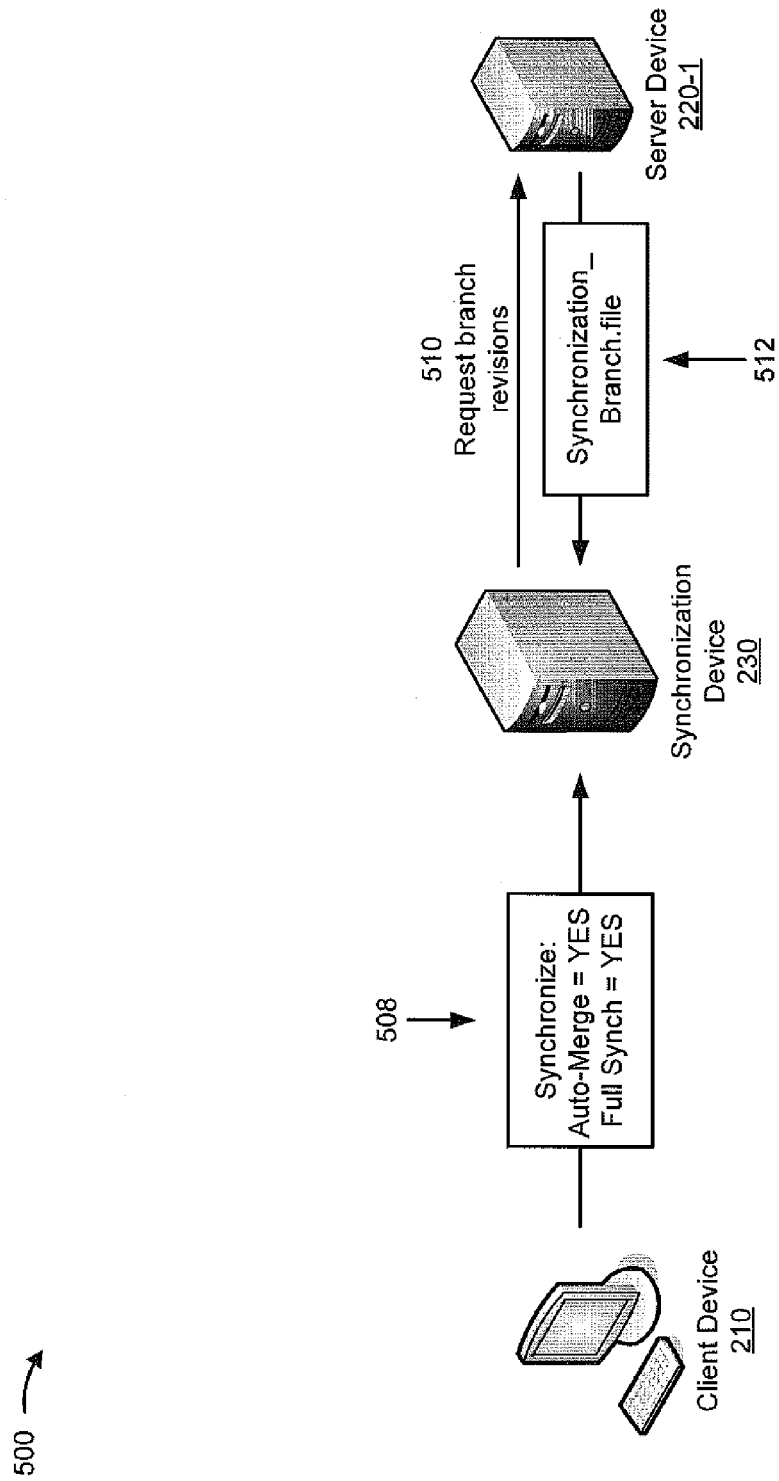

As shown in FIG. 5B, and by reference number 508, client device 210 provides the request to synchronization device 230. As shown by reference number 510, synchronization device 230 requests, form server device 220-1, information associated with the branch revisions. As shown by reference number 512, server device 220-1 provides the information associated with the branch revisions (e.g., "Synchronization_Branch.file") to synchronization device 230.

Figure 5C:
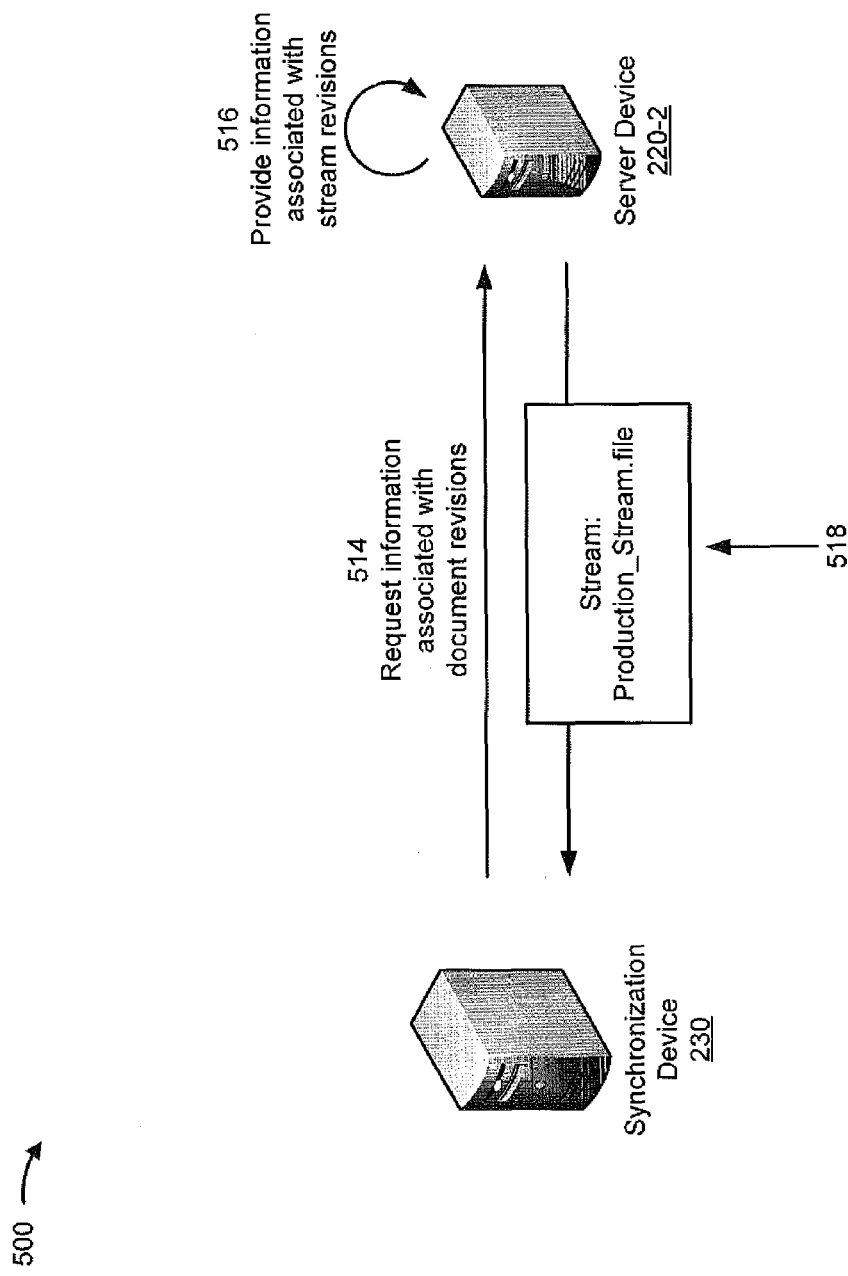

As shown in FIG. 5C, and by reference number 514, synchronization device 230 requests information associated with the stream revisions from server device 220-2. As shown by reference number 516, server device 220-2 receives the request, and provides information associated with the stream revisions to synchronization device 230. As shown by reference number 518, the provided information associated with the stream revisions (e.g., "Production_Stream.file") is received by synchronization device 230.

As shown in FIG. 5D, and by reference number 520, synchronization device 230 generates a list of files to compare based on the provided information associated with the branch revisions and the stream revisions, and compares the files (e.g., by directory, by subdirectory, by process, etc.). As shown by reference number 522, synchronization device 230 determines, based on comparing the stream revisions with the branch revisions, that a first directory for the stream revisions (e.g., "Dir_A") corresponds to another first directory for the branch revisions (e.g., "Dir_a"). Assume that synchronization device 230 determines not to generate a new directory associated with Dir_A based on identifying the corresponding other first directory. Assume synchronization device 230 also determines that a second directory (e.g., "Dir_B") for the stream revisions corresponds to another second directory for the branch revisions (e.g., "Dir_b"), and determines not to generate a new directory associated with Dir_B based on identifying the corresponding other second directory.

Figure 5E:
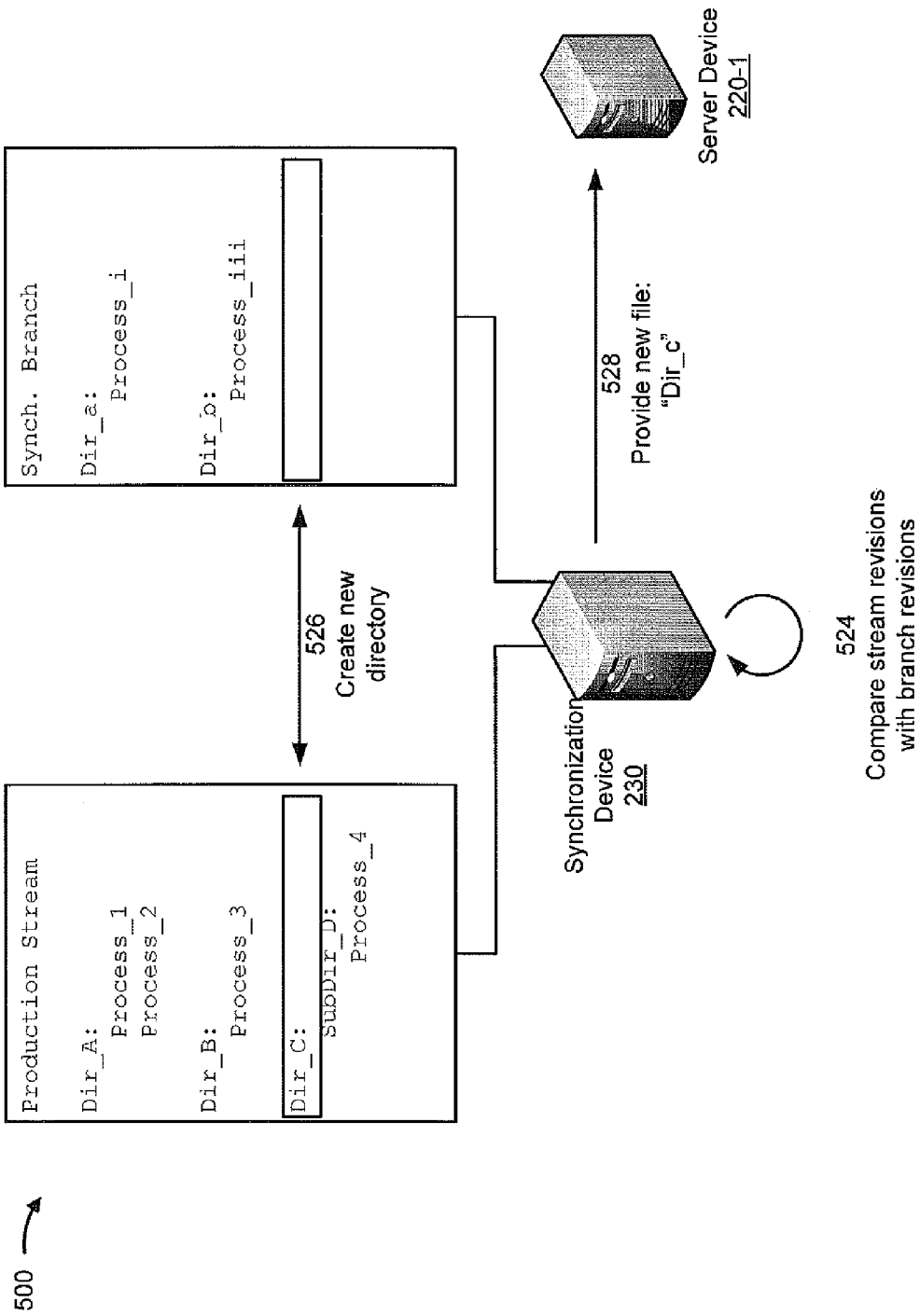

As shown in FIG. 5E, and by reference number 524, synchronization device 230 continues to compare the stream revisions with the branch revisions. As shown by reference number 526, synchronization device 230 determines that a third directory for the stream revisions (e.g., "Dir_C") does not correspond to another third directory for the branch revisions. Synchronization device 230 determines to create a new directory, and as shown by reference number 528, provides a new file to server device 220-1 (e.g. "Dir_c") to create the new directory for the branch revisions.

Figure 5F:
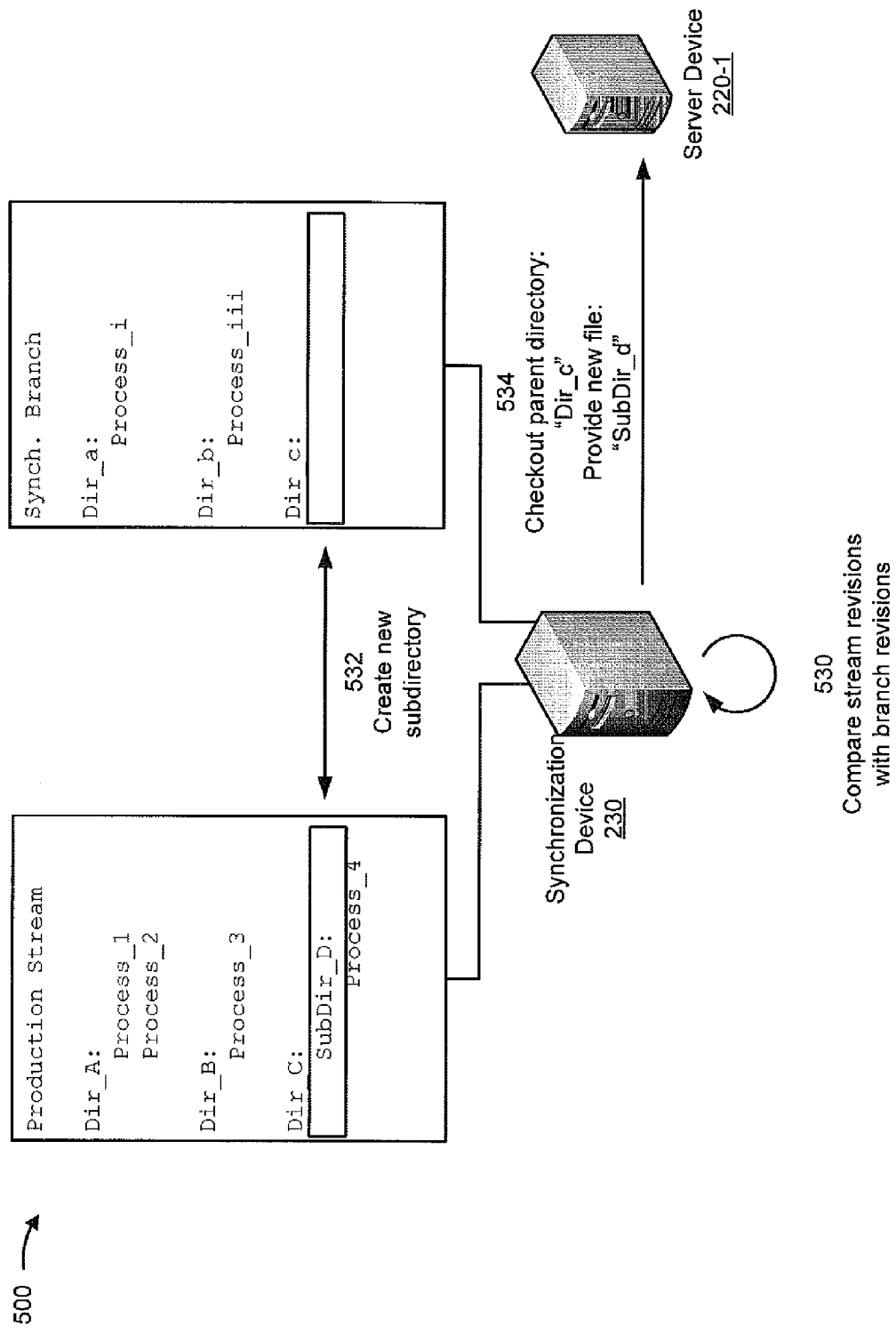

As shown in FIG. 5F, and by reference number 530, synchronization device 230 continues to compare the stream revisions with the branch revisions. As shown by reference number 532, synchronization device 230 determines that a subdirectory (e.g., "SubDir_D") for the stream revisions does not correspond to another subdirectory for the branch revisions. Synchronization device 230 creates a new subdirectory, and as shown by reference number 534, checks out Dir_c (e.g., a parent directory for the new subdirectory), and provides a new file to server device 220-1 (e.g., "SubDir_d") to create the new subdirectory for the branch revisions.

Figure 5G:
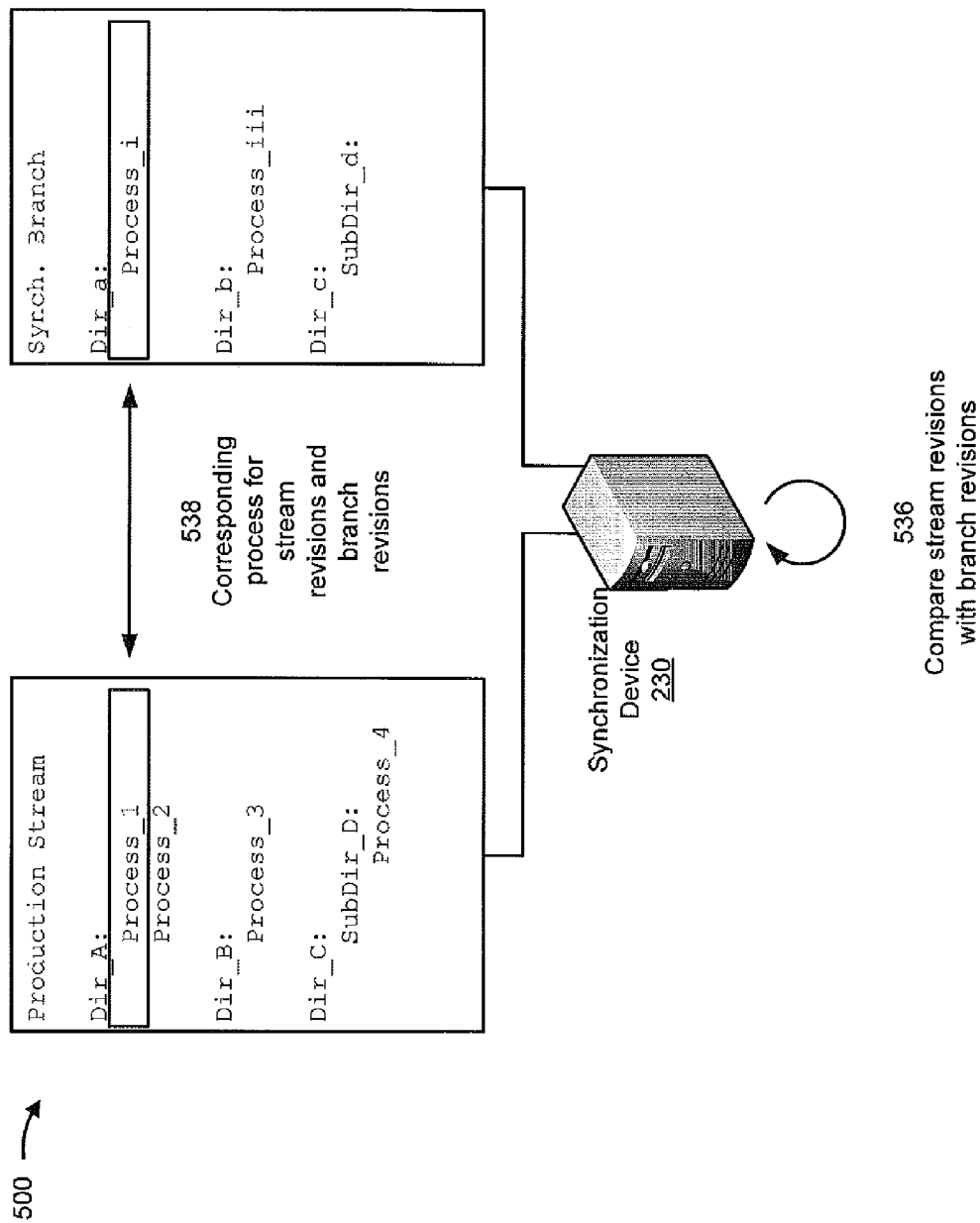
Figure 5H:
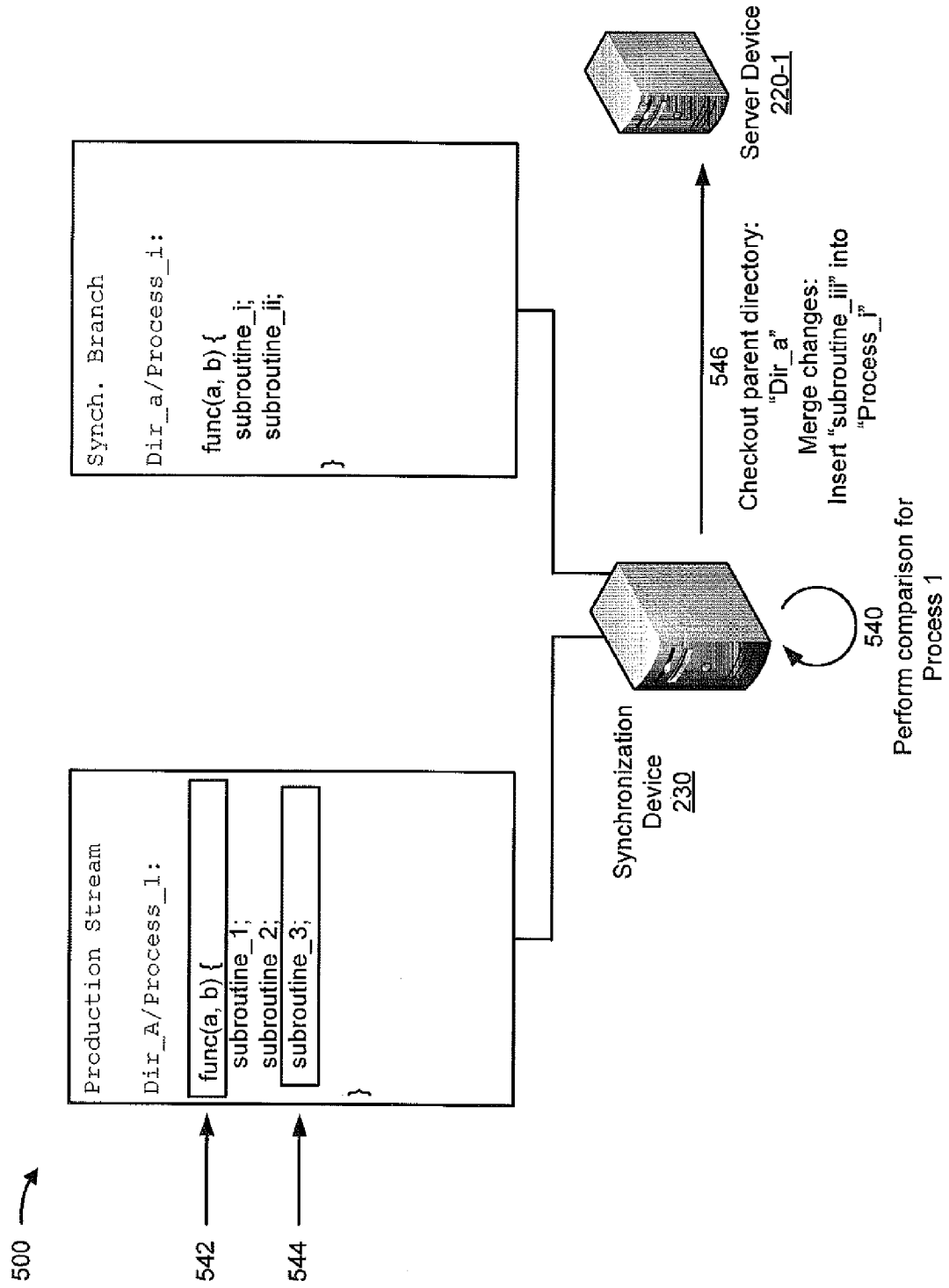

As shown in FIG. 5G, and by reference number 536, synchronization device 230 continues to compare the stream revisions with the branch revisions. As shown by reference number 538, synchronization device 230 determines that a first process (e.g., "Process_1") of the first directory for the stream revisions corresponds to another first process for the branch revisions (e.g., "Process_i"). As shown in FIG. 5H, and by reference number 540, synchronization device 230 performs a comparison of Process_1 of the stream revisions and Process_i of the branch revisions. As shown by reference number 542, synchronization device 230 determines that a particular function of Process_1 for the stream revisions corresponds to another particular function of Process_i for the branch revisions. As shown by reference number 544, synchronization device 230 determines that a subroutine (e.g., "subroutine_3") of Process_1 for the stream revisions does not correspond to another subroutine for the branch revisions. As shown by reference number 546, synchronization device 230 instructs server device 220-1 to check out a parent directory for Process_i (e.g., Dir_a), and synchronization device 230 merges changes from Process_1 for the stream revisions into Process_i for the branch revisions by inserting a new subroutine (e.g., "subroutine_iii").

Figure 5I:
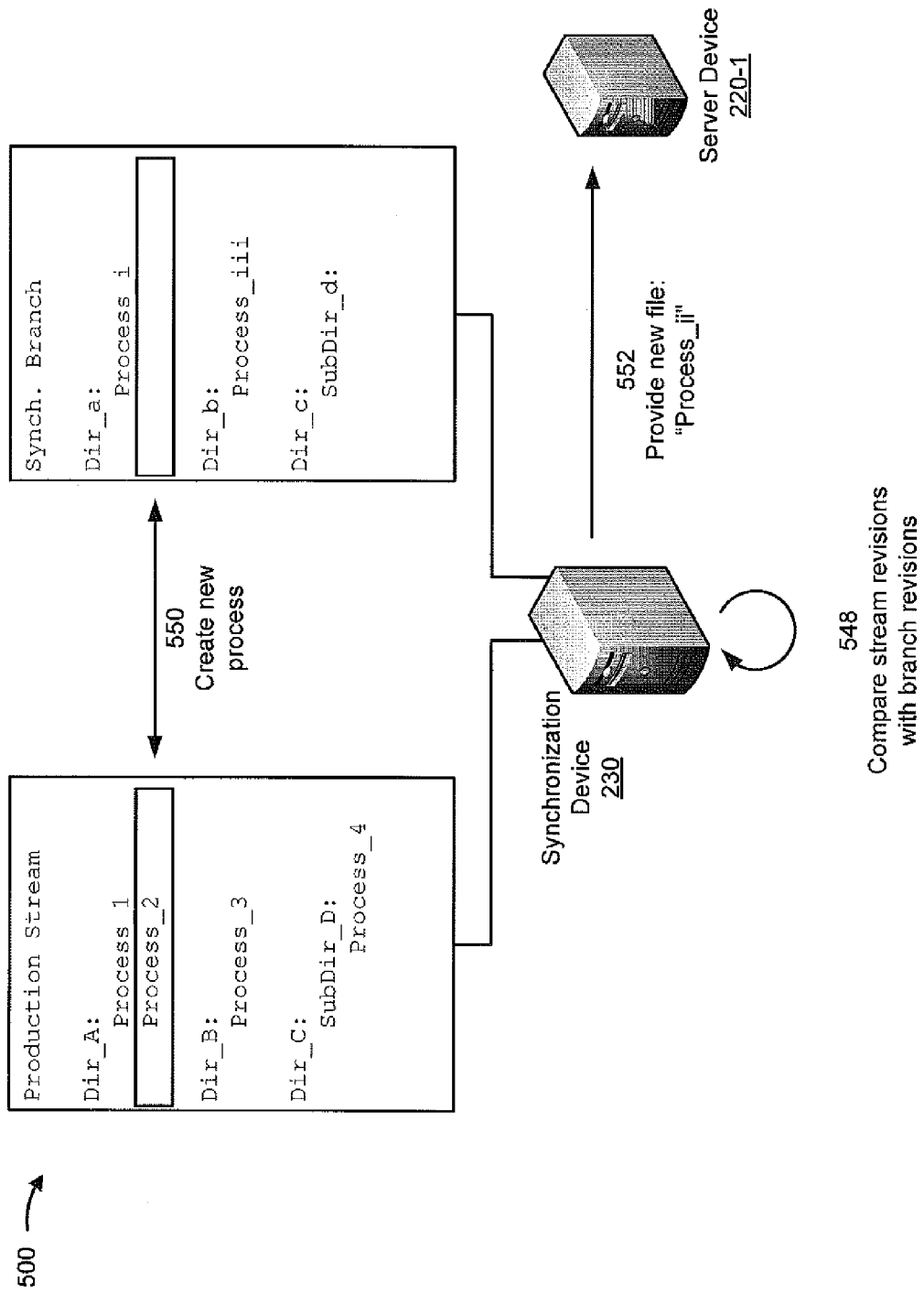

As shown in FIG. 5I, and by reference number 548, synchronization device 230 continues to compare the stream revisions with the branch revisions. As shown by reference number 550, synchronization device 230 determines that a second process that exists for the stream revisions (e.g., "Process_2") does not correspond to another second process for the branch revisions. Assume that Dir_a remains checked out by synchronization device 230. Synchronization device 230 creates a new process file (e.g., "Process_ii"), and as shown by reference number 552, provides the new file to server device 220-1 for the branch revisions. Assume that synchronization device 230 continues to compare and synchronize the stream revisions with the branch revisions.

As shown in FIG. 5J, and by reference number 554, based on determining that all revisions associated with the branch revisions and the stream revisions have been compared and synchronized, synchronization device 230 accesses stored information indicating a set of directories and files that were checked out during synchronization (e.g., "Dir_a", "Dir_c", etc.), and updates a synchronization date identifier for the branch revisions and the stream revisions. As shown by reference number 556, synchronization device 230 instructs server device 220-1 to check in the set of directories. As shown by reference number 558, synchronization device 230 provides an indication of the updated synchronization date to server device 220-1.

Figure 5K:
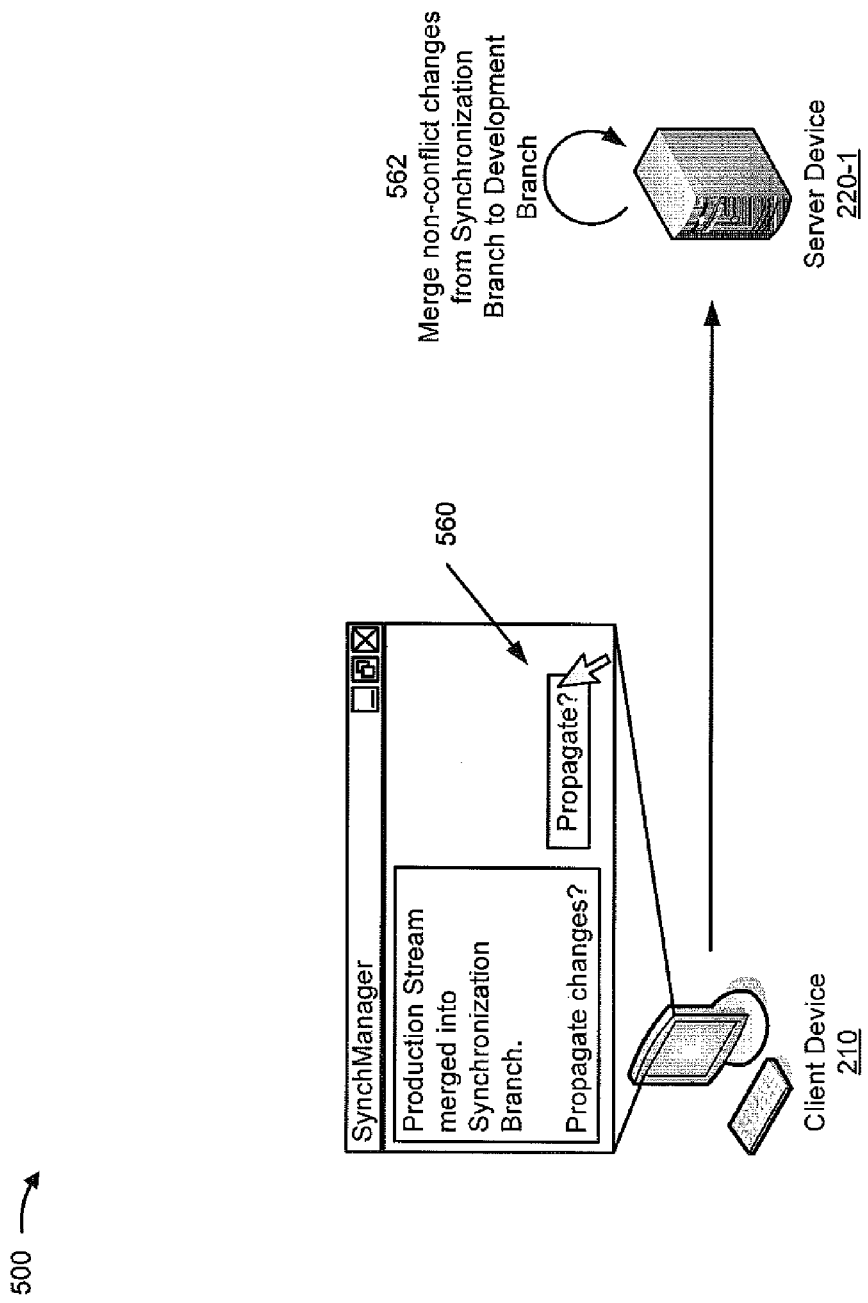

As shown in FIG. 5K, client device 210 displays a confirmation of the synchronization of the stream revisions with the branch revisions. As shown by reference number 560, based on user input, client device 210 instructs server device 220-1 to propagate the synchronized changes in a synchronization branch (e.g., a temporary repository for synchronized document revisions) into a development branch (e.g., for further modification). As shown by reference number 562, server device 220-1 receives the instruction, and merges non-conflict changes.

As indicated above, FIGS. 5A-5K are provided merely as an example. Other examples are possible and may differ from what was described with regard to FIGS. 5A-5K.

Figure 6B:
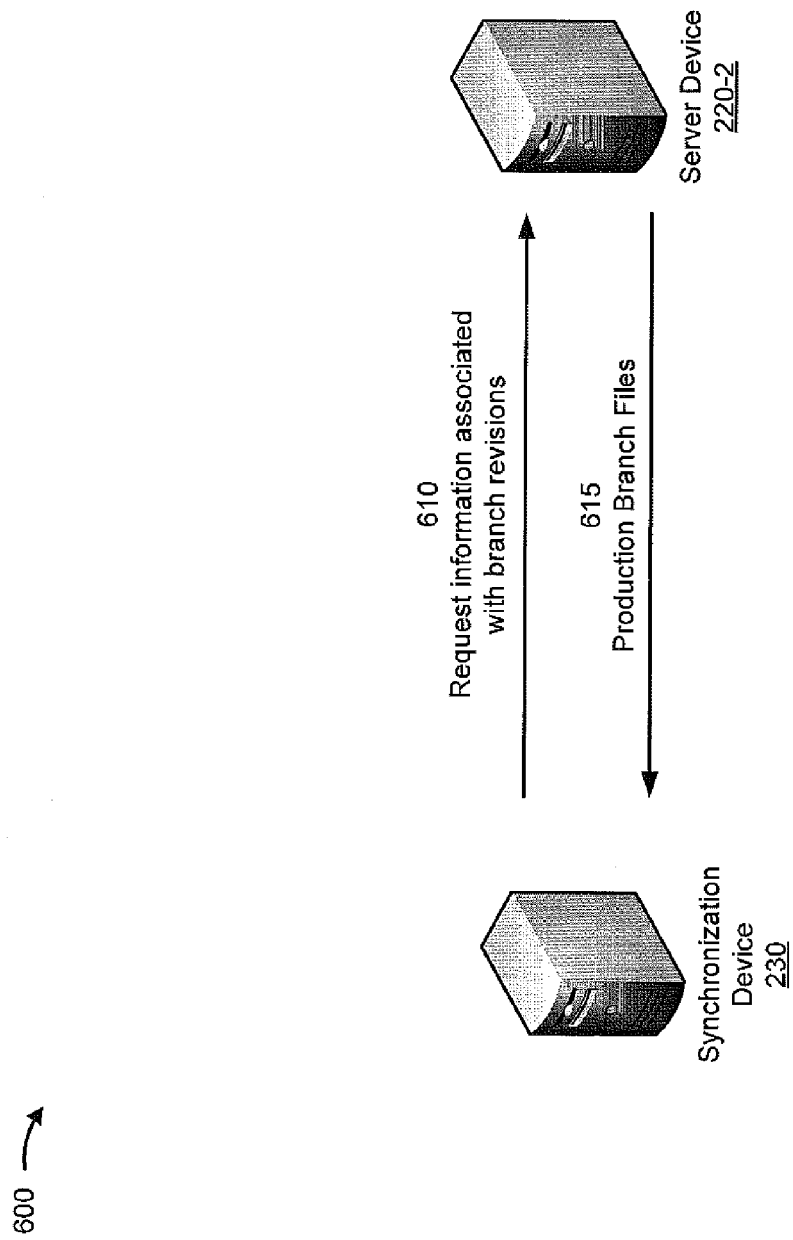

FIGS. 6A-6F are diagrams of another example implementation 600 relating to process 400 shown in FIG. 4. As shown in FIG. 6A, and by reference number 605, synchronization device 230 may determine to auto-run a synchronization at a particular date and/or time (e.g., a date and/or time identified in a memory accessible by synchronization device 230). The auto-run may occur using synchronization configuration information (e.g., stored by synchronization device 230) indicating that synchronization device 230 is not to merge a document revision without user input (e.g., "Auto-Merge=NO"), indicating that only files that are associated with a previous synchronization date prior to a particular date are to be synchronized (e.g., "Synch By Date=Jan. 21, 2013"), and indicating that files associated with a particular extension (e.g., ".zip") are to be filtered from synchronization. Assume that the configuration information specifies that the auto-run synchronization is to synchronize a first set of document revisions associated with a revision management application utilizing a branch architecture (e.g., "branch revisions") with a second set of document revisions associated with another revision management application utilizing stream architecture (e.g., "stream revisions").

As shown in FIG. 6B, and by reference number 610, synchronization device 230 requests information associated with the branch revisions from server device 220-2. As shown by reference number 615, synchronization device 230 receives files associated with the branch revisions from server device 220-2.

Figure 6C:
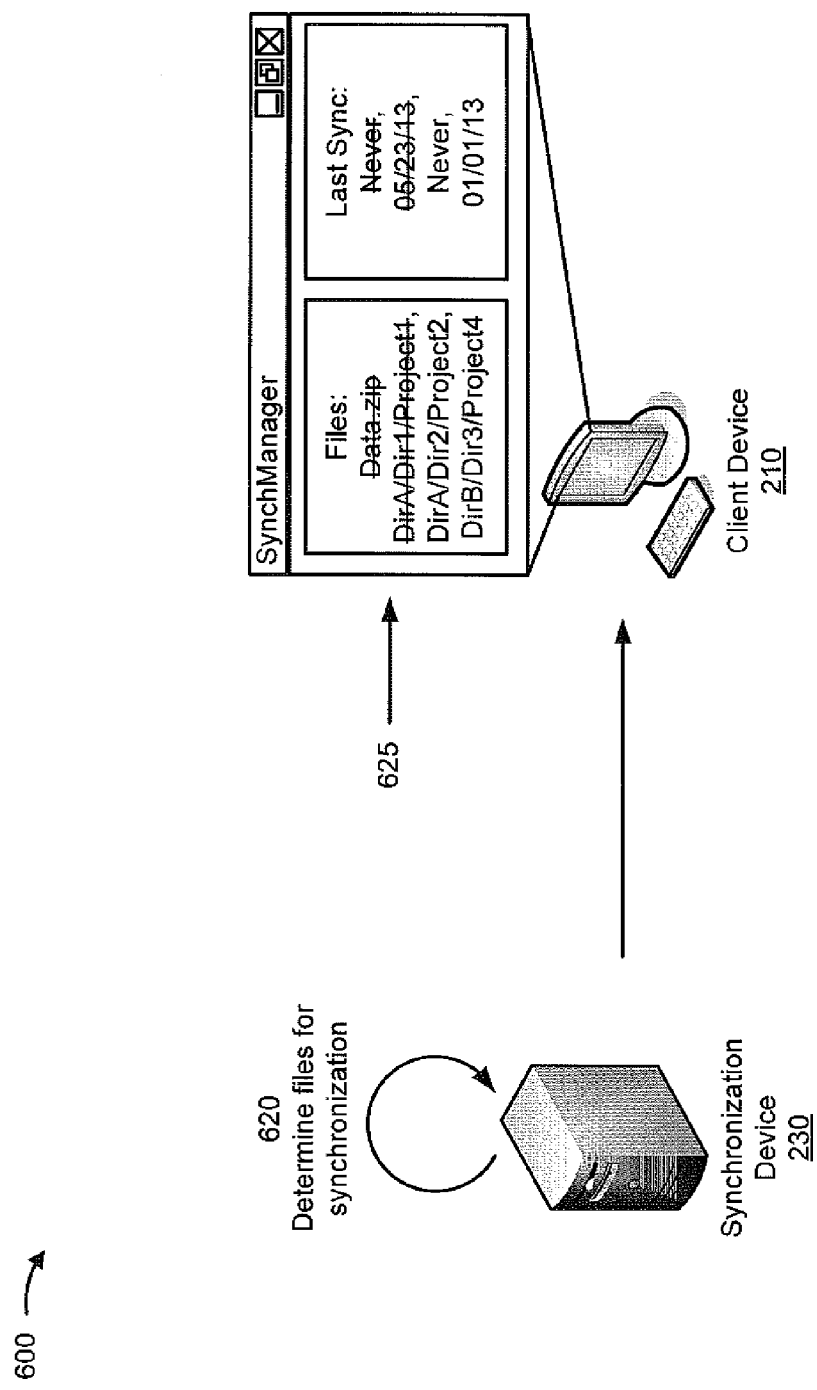

As shown in FIG. 6C, and by reference number 620, synchronization device 230 determines a set of files for synchronization based on the synchronization configuration information, and provides an indication of the set of files to client device 210. As shown by reference number 625, client device 210 displays information regarding the files to be synchronized. A first file (e.g., "Data.zip"), of the Production Branch Files, is filtered from synchronization based on a particular extension of the first file indicated in the synchronization configuration information (e.g., ".zip"). A second file of the branch revisions is filtered from synchronization because the second file is associated with a previous synchronization date (e.g., "May 23, 2013") after the particular date indicated in the synchronization configuration information (e.g., "Jan. 21, 2013").

As shown in FIG. 6D, and by reference number 630, synchronization device 230 compares a particular file (e.g. "DirA/Dir2/Project2") of the branch revisions with information associated with the stream revisions, and determines that a corresponding file is not associated with the stream revisions. Based on determining not to merge files without user input, synchronization device 230 provides information associated with merging the particular file to client device 210. As shown by reference number 635, based on user input, client device 210 indicates to synchronization device 230 that the particular file is to be generated for the stream revisions.

Figure 6E:
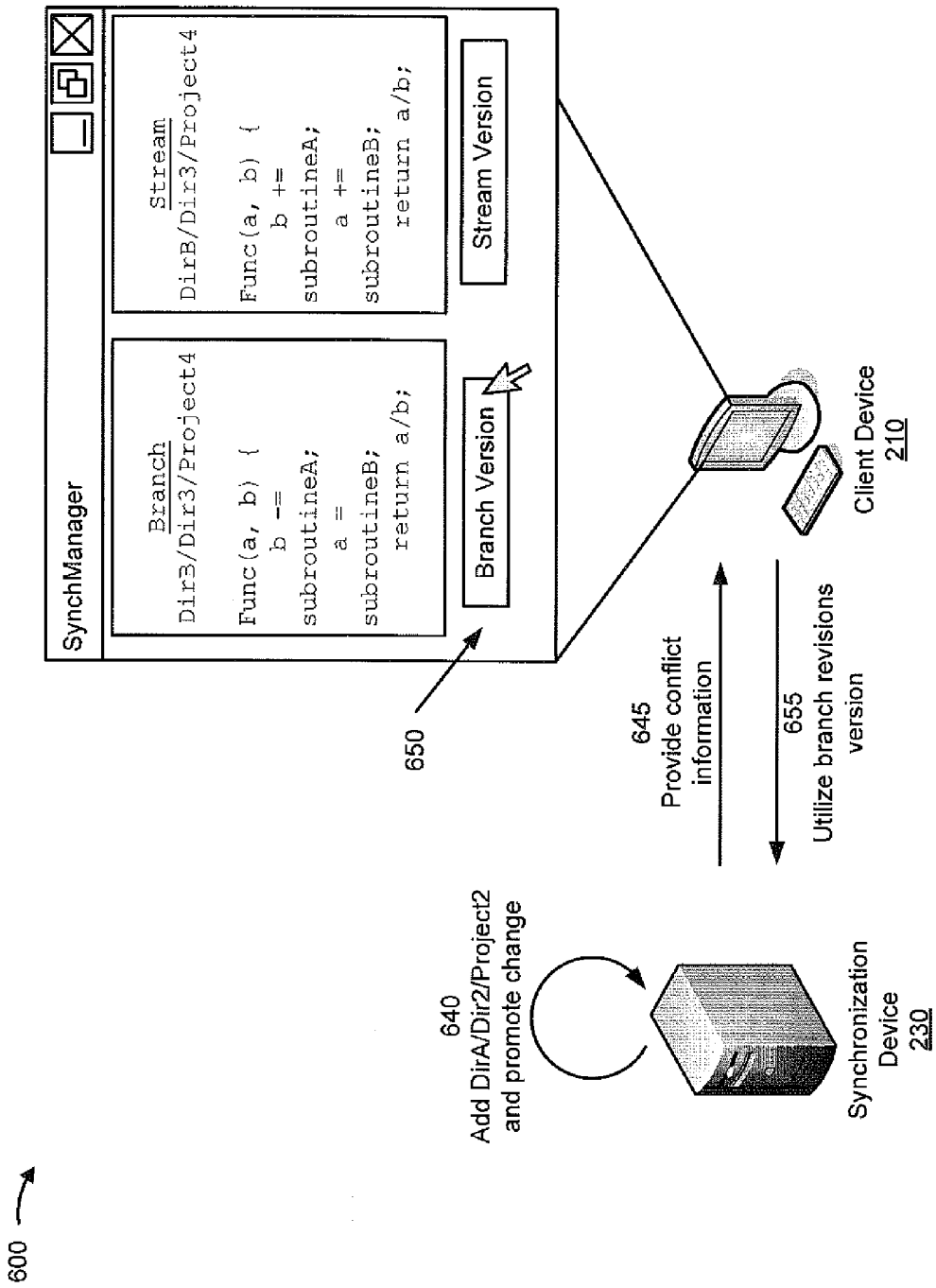

As shown in FIG. 6E, and by reference number 640, synchronization device 230 adds the particular file (e.g., "DirA/Dir2/Project2") to a temporary workspace associated with the stream revisions, and synchronization device 230 promotes the added file to a development stream associated with server device 220-1. Assume that synchronization device 230 compares another file (e.g., "DirB/Dir3/Project4") associated with the branch revisions with a corresponding file for the stream revisions and detects a conflict between the files. As shown by reference number 645, synchronization device 230 provides information associated with the conflict to client device 210 for user selection. As shown by reference number 650, the user selects to have synchronization device 230 use a version of the other file associated with the branch revisions, and as shown by reference number 655, synchronization device 230 receives an indication of the user selection. Assume that synchronization device 230 merges the version of the other file associated with the branch revisions to the temporary workspace and promotes the change to the development stream associated with server device 220-1.

Figure 6F:
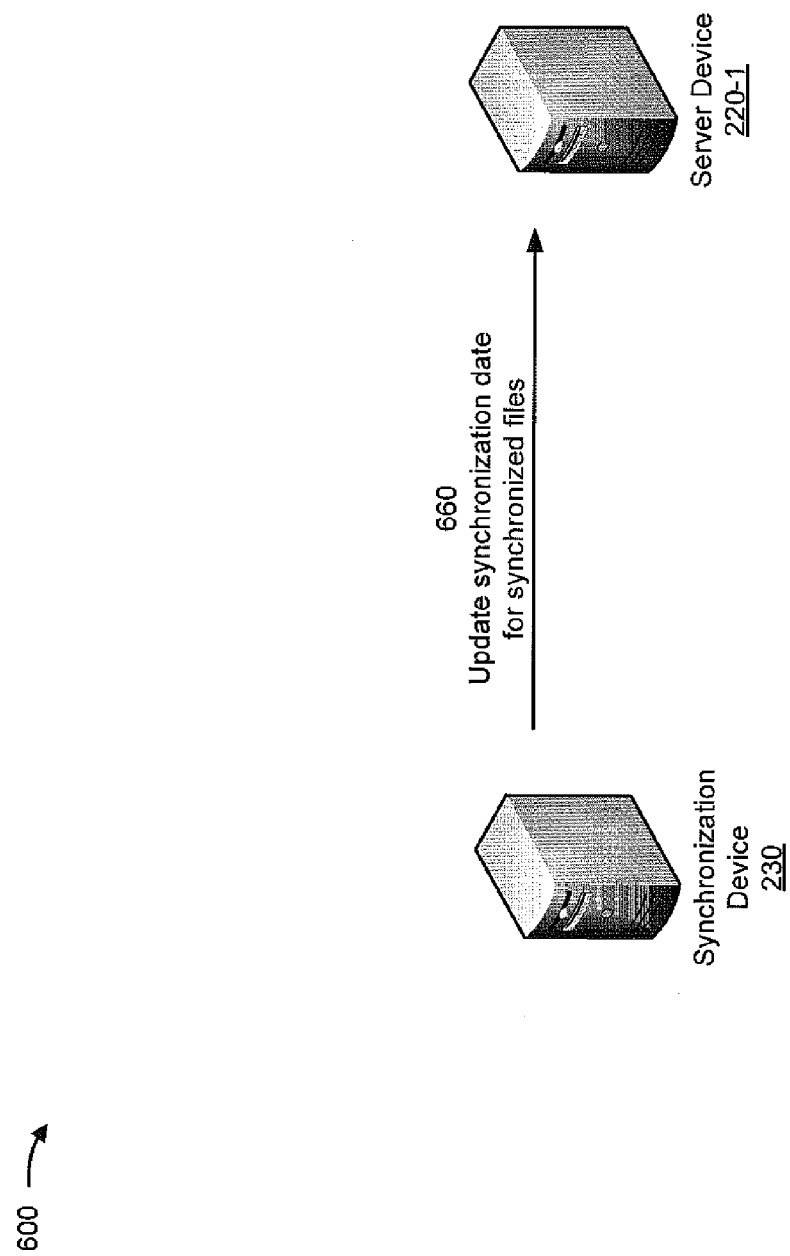

As shown in FIG. 6F, and by reference number 660, based on determining that comparison of files has been completed, synchronization device 230 provides, to server device 220-1, information associated with updating a date of last synchronization for files synchronized by synchronization device 230.

As indicated above, FIGS. 6A-6F are provided merely as an example. Other examples are possible and may differ from what was described with regard to FIGS. 6A-6F.

Implementations described herein may assist a synchronization device in synchronizing a first set of document revisions performed on a first server device utilizing a first revision management application associated with a first revision-control architecture with a second set of document revisions performed on a second server device utilizing a second revision management application associated with a second revision-control architecture.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more hardware processors to:
   receive a request to synchronize a first set of document revisions and a second set of document revisions,
   the first set of document revisions being associated with a first format readable by a first application utilizing a stream architecture,
   the second set of document revisions being associated with a second format readable by a second application utilizing a branch architecture;
   determine synchronization configuration information associated with comparing the first set of document revisions and the second set of document revisions;
   compare the first set of document revisions and the second set of document revisions based on the synchronization configuration information;
   check out at least one parent directory, to deny access to information associated with the at least one parent directory, associated with one or more files associated with the first set of document revisions or the second set of document revisions based on comparing the first set of document revisions and the second set of document revisions;
   selectively modify the one or more files associated with the first set of document revisions or the second set of document revisions based on comparing the first set of document revisions and the second set of document revisions;
   store an indication of the at least one parent directory; and
   provide information associated with checking in the at least one parent directory, to permit access to the information associated with the at least one parent directory, based on the stored indication of the at least one parent directory.

2. The device of claim 1, wherein the one or more hardware processors, when comparing the first set of document revisions and the second set of document revisions, are to:
   determine that a directory process, associated with the first set of document revisions, does not correspond to another directory process associated with the second set of document revisions; and
   wherein the one or more hardware processors are further to:
   create a new directory based on the directory process associated with the first set of document revisions,
   the new directory being associated with the second format; and
   merge the new directory with the second set of document revisions.

3. The device of claim 1, wherein the one or more hardware processors, when comparing the first set of document revisions and the second set of document revisions, are to:
   determine that a file process, associated with the first set of document revisions, does not correspond to another file process associated with the second set of document revisions; and
   wherein the one or more hardware processors are further to:
   create a new file based on the file process associated with the first set of document revisions,
   the new file being associated with the second format; and
   merge the new file with the second set of document revisions.

4. The device of claim 1, wherein the one or more hardware processors, when comparing the first set of document revisions and the second set of document revisions, are to:
   determine that a first file process, associated with the first set of document revisions, corresponds to a second file process associated with the second set of document revisions;
   perform a comparison of the first file process and the second file process; and
   wherein the one or more hardware processors are further to:
      selectively modify the one or more files for the second file process based on performing the comparison of the first file process and the second file process.

5. The device of claim 1, wherein the one or more hardware processors are further to:
   identify a file structure associated with the first set of document revisions, the file structure including one or more directories; and
   wherein the one or more hardware processors, when comparing the first set of document revisions and the second set of document revisions, are to:
      recursively traverse the file structure associated with the first set of document revisions; and
      compare the first set of document revisions and the second set of document revisions based on recursively traversing the file structure associated with the first set of document revisions.

6. The device of claim 1, wherein the one or more hardware processors, when determining the synchronization configuration information, are to:
   determine a file extension filter based on the synchronization configuration information;
   identify a particular file, associated with the first set of document revisions, that includes a file extension corresponding to the file extension filter; and
   remove the particular file from the first set of document revisions that are to be synchronized with the second set of document revisions.

7. The device of claim 1, wherein the one or more hardware processors, when comparing the first set of document revisions and the second set of document revisions, are to:
   determine that a file process or a directory process, associated with the first set of document revisions, is absent for the second set of document revisions; and
   wherein the one or more hardware processors are further to:
      create a new file or a new directory based on the file process or the directory process associated with the first set of document revisions,
         the new file or the new directory being associated with the second format; and
      promote the new file or the new directory to the second set of document revisions.

8. A non-transitory computer-readable medium storing instructions, the instructions comprising:
   one or more instructions that, when executed by one or more processors, cause the one or more processors to:
      receive a request to synchronize a first set of document revisions and a second set of document revisions,
         the first set of document revisions being associated with a first format readable by a first application utilizing a branch architecture,
         the second set of document revisions being associated with a second format readable by a second application utilizing a stream architecture;
      determine synchronization configuration information associated with comparing the first set of document revisions and the second set of document revisions;
      determine that a first file process, associated with the first set of document revisions, corresponds to a second file process associated with the second set of document revisions;
      compare the first file process and the second file process based on determining that the first file process corresponds to the second file process;
      determine that a conflict exists between the first file process and the second file process based on comparing the first file process and the second file process;
      provide information identifying the conflict between the first file process and the second file process;
      receive information associated with resolving the conflict between the first file process and the second file process;
      selectively modify file contents associated with the first set of document revisions or the second set of document revisions based on receiving the information associated with resolving the conflict between the first file process and the second file process; and
      provide information associated with selectively modifying the file contents associated with the first set of document revisions or the second set of document revisions.

9. The non-transitory computer-readable medium of claim 8, wherein the one or more instructions, when executed by the one or more processors, further cause the one or more processors to:
   determine that a directory process, associated with the first set of document revisions, is absent for the second set of document revisions; and
   wherein the one or more instructions, when executed by the one or more processors, further cause the one or more processors to:
      create a new directory based on the directory process associated with the first set of document revisions,
         the new directory being associated with the second format; and
      promote the new directory to the second set of document revisions.

10. The non-transitory computer-readable medium of claim 8, wherein the one or more instructions, when executed by the one or more processors, further cause the one or more processors to:
   determine that a file process, associated with the first set of document revisions, is absent for the second set of document revisions; and
   wherein the one or more instructions, when executed by the one or more processors, further cause the one or more processors to:
      create a new file based on the file process associated with the first set of document revisions,
         the new file being associated with the second format; and
      promote the new file to the second set of document revisions.

11. The non-transitory computer-readable medium of claim 8, wherein the one or more instructions, when executed by the one or more processors, further cause the one or more processors to:
   determine that the first file process corresponds to the second file process;
   perform a comparison of the first file process and the second file process;

determine that the first file process conflicts with the second file process based on performing the comparison of the first file process and the second file process; and wherein the one or more instructions, that cause the one or more processors to selectively modify the file contents associated with the first set of document revisions or the second set of document revisions, cause the one or more processors to:

selectively modify file contents for the second file process based on determining that the first file process conflicts with the second file process.

12. The non-transitory computer-readable medium of claim 8, wherein the one or more instructions, that cause the one or more processors to provide the information associated with selectively modifying the file contents, cause the one or more processors to:

provide information associated with updating a synchronization date identifier associated with the first set of document revisions and the second set of document revisions.

13. The non-transitory computer-readable medium of claim 8, wherein the one or more instructions, that cause the one or more processors to determine the synchronization configuration information, cause the one or more processors to:

determine a synchronization date threshold based on the synchronization configuration information;

identify a file, associated with the first set of document revisions, that includes a synchronization date identifier that satisfies the synchronization date threshold; and remove the file from the first set of document revisions that are to be synchronized with the second set of document revisions.

14. The non-transitory computer-readable medium of claim 8, wherein the one or more instructions, when executed by the one or more processors, further cause the one or more processors to:

determine that a file process or a directory process, associated with the first set of document revisions, does not correspond to another file process or another directory process associated with the second set of document revisions;

create a new file or a new directory based on the file process or the directory process associated with the first set of document revisions, the new file or the new directory being associated with the second format; and merge the new file or the new directory with the second set of document revisions.

15. A method, comprising:

receiving, by a device, a request to synchronize a first set of program code revisions and a second set of program code revisions, the first set of program code revisions being associated with a first format readable by a first revision management application utilizing a first architecture, the second set of program code revisions being associated with a second format readable by a second revision management application utilizing a second architecture;

determining, by the device, synchronization configuration information associated with comparing the first set of program code revisions and the second set of program code revisions;

determining, by the device, that a first file process, associated with the first set of program code revisions, corresponds to a second file process associated with the second set of program code revisions;

performing, by the device, a comparison between the first file process and the second file process based on determining that the first file process corresponds to the second file process;

selectively modifying, by the device, the second set of program code revisions based on performing the comparison between the first file process and the second file process; and providing, by the device, information associated with selectively modifying the second set of program code revisions.

16. The method of claim 15, wherein determining the synchronization configuration information comprises:

determining a synchronization filter;

identifying a subset of the first set of program code revisions corresponding to the synchronization filter; and removing the subset of the first set of program code revisions from the first set of program code revisions that is to be synchronized.

17. The method of claim 15, further comprising:

identifying a synchronization date identifier associated with the first set of program code revisions and the second set of program code revisions; and wherein providing the information associated with selectively modifying the second set of program code revisions comprises:

providing information associated with updating the synchronization date identifier.

18. The method of claim 15, further comprising:

determining that a particular subset of program code revisions, included in the first set of program code revisions, does not correspond to another particular subset of program code revisions included in the second set of program code revisions; and wherein selectively modifying the second set of program code revisions comprises:

merging the particular subset of program code revisions, included in the first set of program code revisions, with the second set of program code revisions.

19. The method of claim 15, further comprising:

determining that a first subset of program code revisions, included in the first set of program code revisions, corresponds to a second subset of program code revisions included in the second set of program code revisions; and wherein selectively modifying the second set of program code revisions comprises:

merging the first subset of program code revisions and the second subset of program code revisions; and wherein providing the information associated with selectively modifying the second set of program code revisions comprises:

providing the information based on merging the first subset of program code revisions and the second subset of program code revisions.

20. The method of claim 15, further comprising:

determining a conflict between a first subset of program code revisions, included in the first set of program code revisions, and a corresponding second subset of program code revisions included in the second set of program code revisions;

providing information identifying the conflict between the first subset of program code revisions and the second subset of program code revisions;

receiving information associated with resolving the conflict between the first subset of program code revisions and the second subset of program code revisions; and wherein selectively modifying the second set of program code revisions comprises:
  selectively modifying the second set of program code revisions based on receiving the information associated with resolving the conflict between the first subset of program code revisions and the second subset of program code revisions.

\* \* \* \* \*